(12) United States Patent
Formhals et al.

(10) Patent No.: US 9,691,386 B2
(45) Date of Patent: Jun. 27, 2017

(54) AUTOMATED VOICE-TO-REPORTING/MANAGEMENT SYSTEM AND METHOD FOR VOICE CALL-INS OF EVENTS/CRIMES

(71) Applicant: Ten Eight Technology, Inc., Chula Vista, CA (US)

(72) Inventors: Anthony Formhals, San Diego, CA (US); Eric C Geerdes, Solana Beach, CA (US)

( * ) Notice: Subject to any disclaimer, the term of this patent is extended or adjusted under 35 U.S.C. 154(b) by 0 days.

(21) Appl. No.: 14/470,026

(22) PCT Filed: Feb. 28, 2013

(86) PCT No.: PCT/US2013/028377
§ 371 (c)(1),
(2) Date: Aug. 27, 2014

(87) PCT Pub. No.: WO2013/130847
PCT Pub. Date: Sep. 6, 2013

(65) Prior Publication Data
US 2016/0203817 A1   Jul. 14, 2016

Related U.S. Application Data

(60) Provisional application No. 61/604,196, filed on Feb. 28, 2012, provisional application No. 61/658,641, filed on Jun. 12, 2012.

(51) Int. Cl.
*H04M 11/00* (2006.01)
*G10L 15/26* (2006.01)
(Continued)

(52) U.S. Cl.
CPC .............. *G10L 15/26* (2013.01); *G10L 15/22* (2013.01); *G10L 15/265* (2013.01);
(Continued)

(58) Field of Classification Search
CPC ..... H04W 4/12; H04W 4/14; H04M 2242/04; H04M 3/5116; H04M 1/72536;
(Continued)

(56) References Cited

U.S. PATENT DOCUMENTS 5,809,112 A * 9/1998 Ryan .................... H04M 11/066
379/52
9,112,996 B2 * 8/2015 Klaban ................... B60R 25/33
(Continued)

FOREIGN PATENT DOCUMENTS

WO   2005/122145 A1   12/2005

*Primary Examiner* — Stella Woo
(74) *Attorney, Agent, or Firm* — Douglas A Scholer

(57) ABSTRACT

A system for institutions (particularly public safety) to accept spoken information such that users can report incident details as required to convey an official incident (e.g., crime) report and to aid in the investigation of the incident. Similarly, users can employ a combination of voice or text input, media submission, [GUI menu screens] and information download to aid in the immediate analysis of incident information to facilitate a rapid response for the incident. This method of interaction with institutions enables reporting parties to more quickly and efficiently convey incident information when direct interaction by an official is not possible or is subject to delay. This helps institutions, for example, police to provide better services while using less staff and resources.

18 Claims, 22 Drawing Sheets

(51) Int. Cl.
*G10L 15/22* (2006.01)
*H04M 3/51* (2006.01)
*G10L 15/08* (2006.01)

(52) U.S. Cl.
CPC ..... *H04M 3/5116* (2013.01); *G10L 2015/088* (2013.01); *G10L 2015/228* (2013.01)

(58) Field of Classification Search
CPC .......... H04M 3/42382; H04M 3/5191; H04M 1/72552; H04M 11/045; H04Q 2213/1337; G10L 15/26; G10L 15/22; G10L 15/265; G10L 2015/088; G10L 2015/228
See application file for complete search history.

(56) References Cited

U.S. PATENT DOCUMENTS

| | | | |
|---|---|---|---|
| 2004/0218751 A1* | 11/2004 | Colson | H04M 3/51 379/265.09 |
| 2005/0027536 A1 | 2/2005 | Matos et al. | |
| 2007/0094034 A1* | 4/2007 | Berlin | G10L 15/26 704/273 |
| 2010/0174564 A1* | 7/2010 | Stender | G06Q 40/08 705/4 |
| 2013/0052983 A1* | 2/2013 | Fletcher | H04W 4/22 455/404.2 |
| 2013/0144863 A1* | 6/2013 | Mayer | G06F 21/6218 707/711 |
| 2014/0114691 A1* | 4/2014 | Pearce | G06Q 40/08 705/4 |

* cited by examiner

AUTOMATED VOICE-TO-REPORTING/MANAGEMENT SYSTEM AND METHOD FOR VOICE CALL-INS OF EVENTS/CRIMES

CROSS-REFERENCE TO RELATED APPLICATION(S)

This application is a National Stage filing of PCT application no. PCT/US2013/028377 filed Feb. 28, 2013, which claims the benefit of U.S. Provisional Patent Application Nos. 61/604,196, filed Feb. 28, 2012 and 61/658,641 filed Jun. 12, 2012, both titled "Automated Voice-to-Reporting/Management System and Method for Voice Call-ins of Events/Crimes," the priority and benefit being claimed herein and the contents of which are hereby incorporated by reference in their entirety.

FIELD

This invention relates to managing voice call-ins. More particularly, the invention relates to computer-aided management of processing/reporting of voice call-ins in official reporting scenarios.

BACKGROUND

Public safety institutions (local, State and Federal) are mandated to provide services to victims of crime as well as a continuance of crime prevention activities. Responsibility for these service commitments, including responding to emergencies, are usually assigned to a limited collection of trained officers and officials. When criminal acts occur, these officials must constantly evaluate the incident priority and deploy resources based upon the level of emergency and the potential for suspect apprehension.

Due to a higher demand than capacity, the response to lower priority criminal incidents is regularly delayed or neglected indefinitely. This causes degraded service levels, higher crime rates in certain categories and a continual strain on the limited number of officers who are available. As an alternative, some institutions employ representatives who possess a lower level of training that may respond to the incident location, or provide services via a call center. These methods still require staffing of qualified individuals and the associated cost of employment. While reducing the burden on the "officials," a significant amount of manpower and the attendant costs are still required under the current response paradigm.

In view of the above, more efficient/effective methods and systems to responding/managing call-ins for emergency or other related events are needed. Methods and systems which address these and other deficiencies in the above-stated paradigm are elucidated in the following description.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of the disclosed embodiments, an automated, computerized incident reporting apparatus is provided, comprising: a call-in system, adapted to receive a call-in containing at least one of received voice and text from a user reporting an incident; a web-services connection system, adapted to access at least one of a Computer Aided Dispatch (CAD) system, Records Management System (RMS), and emergency public-safety access point system, to provide at least one of complementary information and verification information concerning at least one of the user and the incident; and an automated voice processing service, adapted to receive at least one of the complementary information and verification information, perform an automatic analysis of at least one of the received voice and text, respond to the user with context and key word sensitive questions, associate an ID to the incident, forward the received voice to a transcription service, receive a transcription from the transcription service, create from the transcription and text (if received from the user) and from the complementary information and verification information a report detailing facts of the incident, provide an authorized person the report to review and edit the report, and create a finalized report of the incident, wherein the context and key word sensitive questions utilize a questioning structure with fixed and dynamic properties.

In another aspect of the disclosed embodiments, a method for automatically generating an incident report is provided, comprising: receiving a call-in containing at least one of received voice and text from a user reporting an incident at a call-in system; accessing at least one of a Computer Aided Dispatch (CAD) system, Records Management System (RMS), and emergency public-safety access point system, to provide at least one of complementary information and verification information concerning at least one of the user and the incident via a web-services connection system; and receiving at least one of the complementary information and verification information, perform an automatic analysis of at least one of the received voice and text, respond to the user with context and key word sensitive questions, associate an ID to the incident, forward the received voice to a transcription service, receive a transcription from the transcription service, create from the transcription and text (if received from the user) and from the complementary information and verification information a report detailing facts of the incident, provide an authorized person the report to review and edit the report, and create a finalized report of the incident, via automated voice processing service, wherein the context and key word sensitive questions utilize a questioning structure with fixed and dynamic properties.

DETAILED DESCRIPTION

In various exemplary embodiments described below, methods and systems for the computerized acceptance of spoken information for crime/emergency/event reporting are presented. Generally speaking, effective service to reporting parties can be provided with a computerized interaction that uses audio and visual interfaces with structured automation to effectively prompt for information, capture relevant responses and complete as-needed report(s) without the need for immediate involvement by an official. In various embodiments, the exemplary system will utilize computerized displays; computerized vocalizations; decision logic that validates completeness, as well as identify duplicate reports and highlight key words or phrases; commencement of outbound voice communications; selection of pre-defined responses for the reporting party; enablement of reporting party to complete follow-up actions for the same incident or prohibit further manipulation of the report. As will be detailed below, automation of the report generation aspects of the exemplary embodiments provides, among other aspects, significant savings in manpower, time and costs while enhancing service-levels. While the examples below may be described for victims of lesser crimes, it is understood that the exemplary embodiments may be applied to the reporting of other crime/emergency/event situations.

Figure 1:
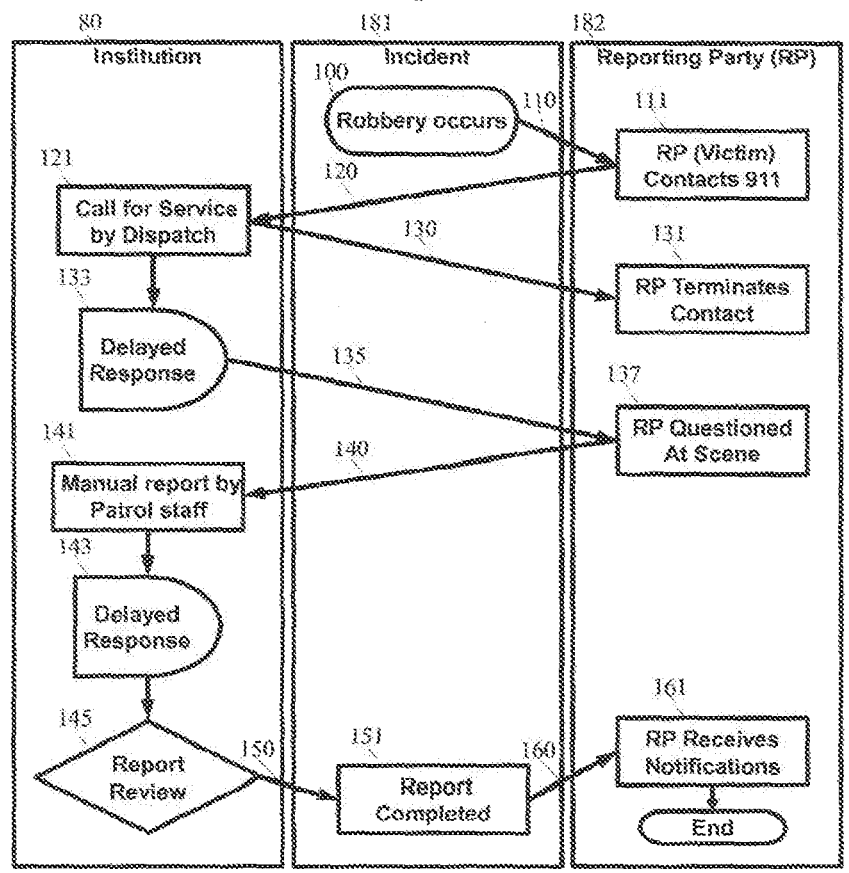
FIG. 1 is an illustration of a prior art, reporting/response process for a crime (e.g., robbery) scenario.

FIG. 1 is an illustration of a prior art, reporting/response process for a crime (e.g., robbery) scenario having an Institution 180 and Reporting Party (RP) 182. Incident 181 describes the flow between Institution 180 and RP 182. When an event 100 (for example, Robbery) occurs and the victim RP 182 discovers it 110, he calls 120 the Institution 180, which is received by a Dispatcher 121. After 130 providing the details to the Dispatcher 121, the call is terminated 131 by the RP 182. A period of delay 133 occurs at the Institution 180, whereupon officers are sent 135 to the scene, to investigate, gather facts 137 from the RP 182. After 140 the facts are gathered, a report is manually generated 141 by officers and/or personnel at the Institution 180. After another period of delay 143, the report is reviewed by supervisors 145 and after 150 review, the report is "approved/completed" 151. The completed report 151 is then forwarded 160 to the RP 182 who eventually receives 161 the completed report 151. As is apparent, there are many delays in the prior art approach, as well as the significant dedication of several levels of manpower to ultimately generate a report.

Figure 2:
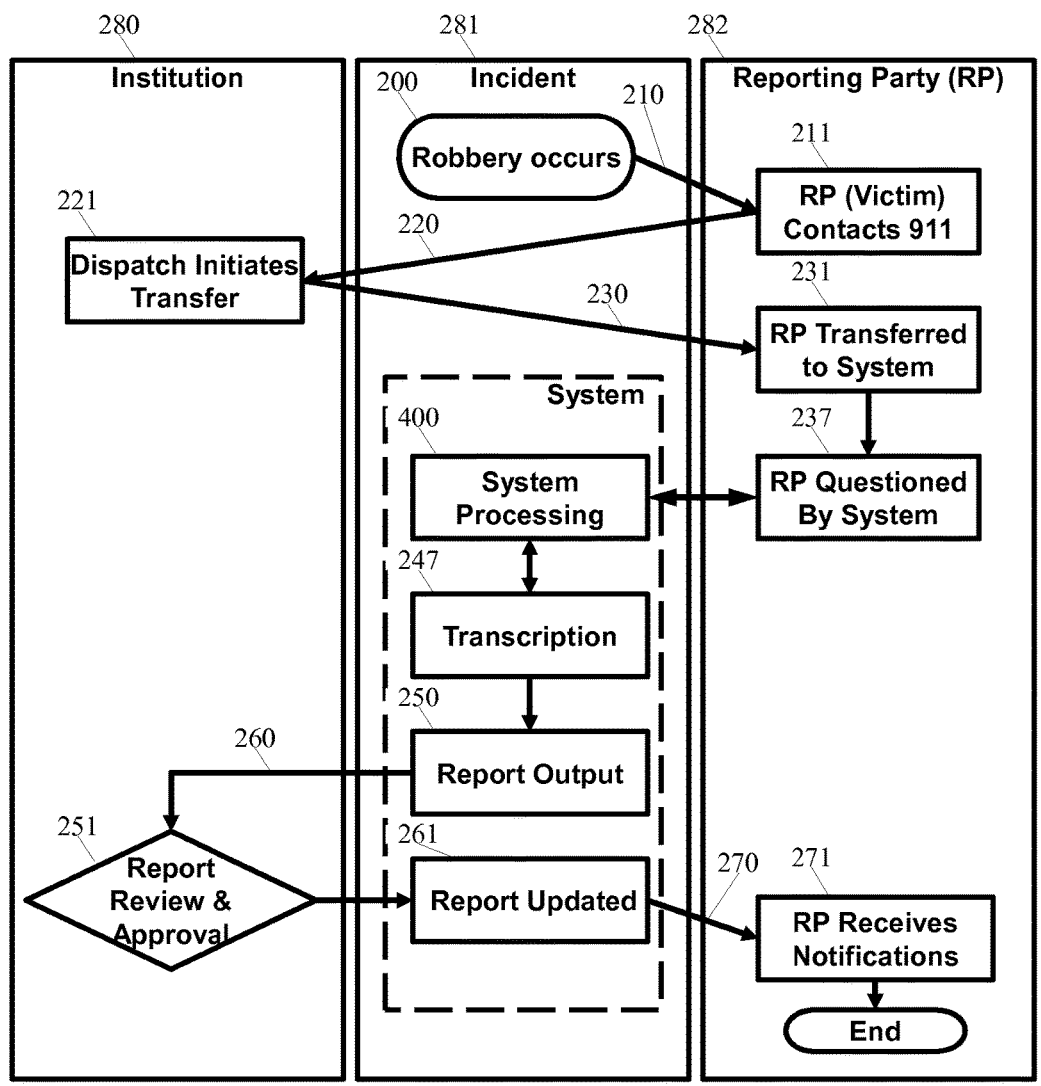
FIG. 2 is an illustration of an exemplary reporting/response process applied to a crime/scenario.

FIG. 2 is an illustration of an exemplary reporting/response system applied to the scenario of FIG. 1. Similar to FIG. 1, an incident (shown in this example as a robbery) 200 occurs and similar steps between the RP 282 and the Institution 280 occur for the initial call 220. However, upon determination by the Dispatcher 221, an exemplary reporting system is implemented to expedite many of the steps performed in FIG. 1. For example, the exemplary reporting system is engaged 230 by Dispatcher 221, to transfer 231 the queries with the RP 282 to be automatic 237, as interfaced by System Processing module 400. System Processing module 400 forwards the responses to be transcribed to Transcription module 247 which is then converted into a report by Report Output module 250. In some embodiments, a measure of transcription certainty is retained for the Report Output module 250. Report Output module 250 forwards 260 (automatically, if needed) to the "officials" or supervisors 252 in or associated with Institution 280, who then update 261, if necessary, the report. The updating may simply be approval or requests for more information, or the addition of information. The exemplary reporting system then forwards 270 a copy of the finalized report to the RP 271.

In various embodiments, the exemplary reporting system may have a voice application(s) as part of the System Processing module 400 which interacts with the RP 282 to collect appropriate details which are forwarded to Transcription module 247. The exemplary reporting system is understood to be automated, however, in some instances human-assisted transcription services may be relied upon for the Report Output module 250. Accordingly, in some instances, a portion or entirety of the transcription can be off-loaded to human transcription service (not shown). In some instances, the human transcription service may simply operate to error check or validate the results of Transcription Module 247. For example, text or grammar checking could be performed in Transcription Module 247 and an error flag could be set which would send the error-tagged portion with the corresponding voice recording portion to the human transcription service. Of course, in some implementations (as a non-limiting example, a high priority call) the entirety or a large portion of the actual voice recording may be transcribed by the human transcription service.

Upon transcription, various forms of error checking (as a non-limiting example, correlating a reported address in the transcription with the actual address of the caller) or some other quality control measure may be executed, if so desired. Further, the Report Output Module 250 can also be forwarded to officials who may yet respond, those that have been "on-site" or officials that are familiar with the situation at hand for additional input or correction, by either the exemplary reporting system or by the RP 282.

Upon satisfaction of the report details, the RP 282 can bring closure to the call-in scenario by, as a non-limiting example, making a payment, if this is an insurance related claim, or sending officials to the site, if the report indicates that officials should visit the site/caller (if they have not already). Of course, other responses are possible, the above examples just describing a few of many possible resolution scenarios.

It should be apparent that the above exemplary paradigm is not limited to solely crime reporting, but can also be applied to other situations where an event or details of an event are documented for review and approval. For example, in the event of a post natural catastrophe, the harmed party could orally detail the circumstances/facts of their loss to their insurance company and the exemplary reporting system could be used to assist in claim assessment and reporting. Due to "sensitivities" of the exemplary reporting system to key words or phrases that are germane to assessing the seriousness or urgency of the caller's need, the exemplary reporting system can be designed to be flexible enough to provide personalized service (e.g., switch to a human, or official in the vicinity) when needed.

With automated reporting, and recognizing the capabilities provided by such, the on-site agent/official could be afforded the benefit of receiving a pre-report (e.g., detailing the caller's facts) perhaps, even en route to the caller's site. Other possible non-limiting examples are for medical services or emergencies, where a request for an ambulance could be vetted in a similar way, to determine if the need for the ambulance is genuine or a non-emergency. Also, prior to arrival of the medical technicians to the caller's residence, some form of documentation from the exemplary reporting system could be forwarded to the medical technician, to assist, if needed, the treatment and handling of the patient. Significant time savings can be obtained if an automatic reporting system, as described, is utilized in the emergency field. For example, the prior art Dispatcher typically fields the entire call before relaying information to emergency personnel, which carries a large delay in time. If the secondary details can be offloaded to an exemplary reporting system, the Dispatcher can immediately inform the necessary emergency personnel to begin their travel to the emergency site.

Further, with the capability to provide voice-to-report, the exemplary reporting system may be used by the officials themselves, as a means for "adding" to the report. That is, in some embodiments, the official may "call in" and dictate into the exemplary reporting system to assist in formulating the facts for the end report. Accordingly, while the voice-to-report conversion process is initially described for benefiting the "first" communication, it may be applied to subsequent sessions—by the "victim" and/or by the official(s).

Figure 19:
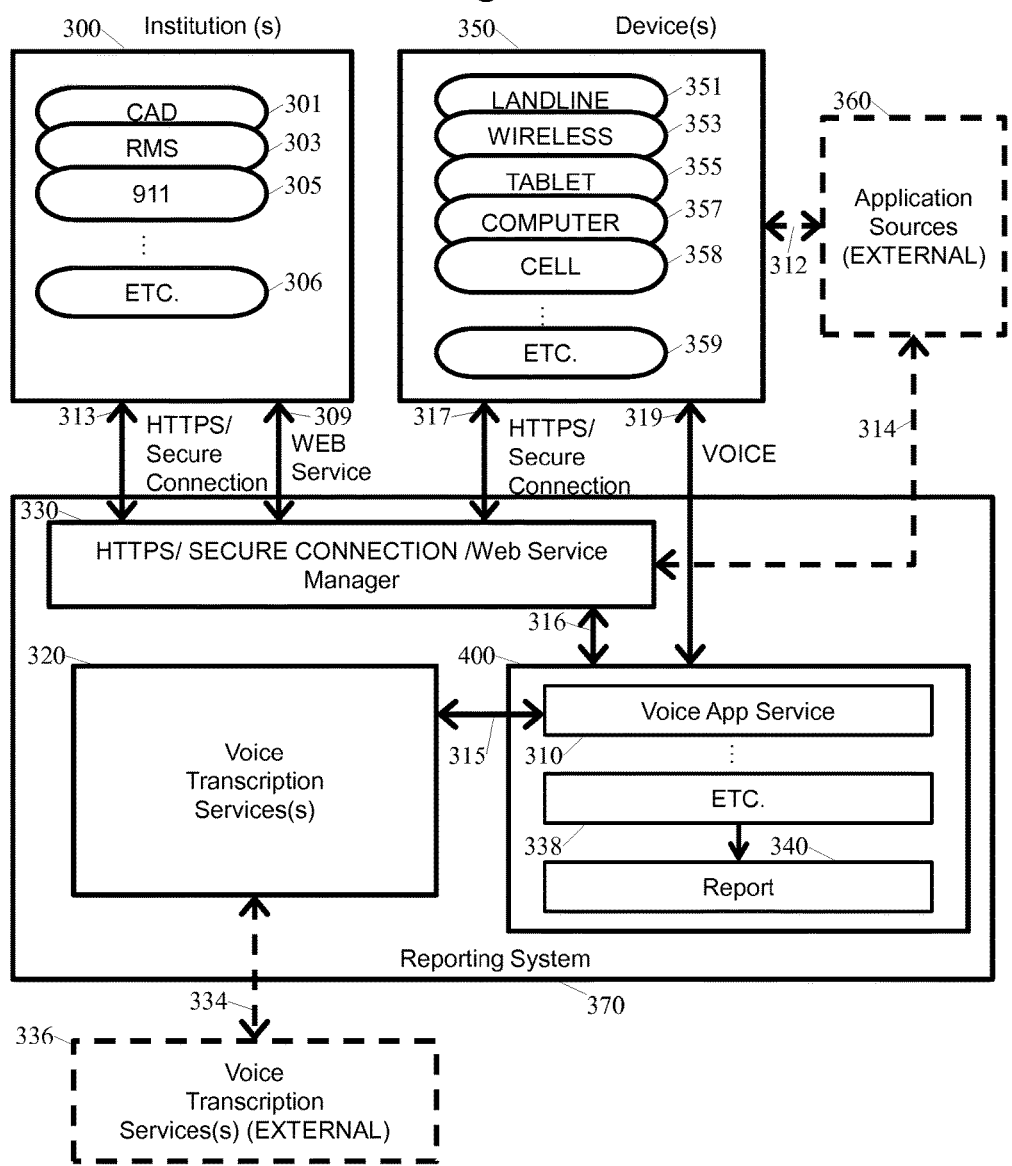
FIG. 19 is a block diagram illustration showing possible supporting architecture(s) for an exemplary reporting system.

FIG. 19 is a block diagram illustration showing possible supporting architecture(s) for an exemplary reporting system. The exemplary reporting system 370 communicates to various Institutions 300 and Device(s) 350, via connections (maybe secure, for example, HTTPS) 309, 317, web service connection 313 and voice connection 319. The Institutions 300 can be a compendium of "external" systems which can contain a Computer Aided Dispatch (CAD) system 301, Records Management System (RMS) 303, and emergency public-safety access point system (aka 911 service) 305, as well as other systems 306 that may be institutional or not. In a crime based scenario, the RMS 303 will commonly be the official repository of crime reports. The Institutions 300, depending on the call-in scenario, provide complementary information and/or verification information concerning the reporting party. For example, the caller's location based on 911 support.

Devices 350 can contain a repertoire of various communication devices including landlines 351, wireless 352, tablet computers 355, computers/servers/etc. 357, cell phones or cell based communication devices 358, as well as other now or future derived communication devices 359.

The exemplary reporting system 370 contains a Voice-to-Reporting Services engine 400, Voice Transcription Service(s) module 320 and Connection/Web Service Manager module 330, shown here as being secure. Due to different communication paradigms by different systems, Connection/Web Service Manager module 330 is utilized to coordinate secure and/or web-based digital communications between the various systems via connections 309, 313 and 317, and forwarding such communications to Voice-to-Reporting Services engine 400 via link 316. Though not explicitly shown, Connection/Web Service Manager module 330 can include secure data storage, application provisioning, analysis tools and decision support logic.

The Connection/Web Service Manager module 330 can provide application or software provisioning onto one or more of the user's Devices 350 from the Reporting System 370 via link 317, or via external Application Sources 360 using communication links 312 and 314 using any means available, for example, HTTP/Web, cellular, wi-fi, etc. The Connection/Web Service Manager 330 can also initiate via link 317, for example, the launching of applications on one or more of the Devices 350 upon the completion of provisioning, along with loading of session specific application data associated with the current report input session.

Voice Transcription Service(s) module 320 communicates with Voice-to-Voice-to-Reporting Services engine 400 via link 315. Voice transcription for Voice Transcription Service(s) module 320 can be externally facilitated by Voice Transcription Service 336 via external link 334. Voice transcription can be accomplished using computerized speech recognition, manual voice transcription services by another person, or some combination thereof. Voice transcription via Voice Transcription Service(s) 336 (320) may have a transcription mode selection capability, to dynamically select the optimal method of transcription using criteria such as: transcription service costs, process duration; transcription quality, current service performance levels, transcription processing time, and the nature of the information being transcribed. Actual voice call-ins from Device(s) 350 may be channeled, if so desired, directly to Voice App Service 310 in the Voice-to-Reporting Services engine 400. Voice-to-Reporting Services engine 400 will also contain Reporting module 340, as well as other necessary modules 338. In some instances, a mode of Voice Transcription Service(s) module 320 may augment its transcription capability by spoken repetition of original responses by a secondary person whose voice is directly linked to better-trained automated speech recognition services.

The bi-directional nature of the various communication links indicates that communication can also occur "from" the exemplary reporting system 370. For example, Voice App Service 310 in the Voice-to-Reporting Services engine 400 will have the capability to prompt/ask questions to a caller (aka Device(s) 350), conceivably even with text messaging, if so configured. Therefore, an interaction with caller can be via a computerized presentation and reception of spoken dialog, if so configured.

Also, information between CAD system 301, RMS 303, and emergency public-safety access point system (aka 911 service) 305 can be downloaded/uploaded, if so designed, allowing various offices in Institutions 300 to be updated with current information from the Voice-to-Reporting Services engine 400. This process enables information about an incident to be forwarded, by the Institution(s) 300, to responding officials in the event they dispatched at some point after the reporting party has provided the initial input.

As another example of information exchange, CAD 301 may exchange data/information with "911" institutions 305, RMS 309, using information stored in the exemplary voice-based reporting system 370. This "integration" allows various institution(s) 300 to exchange incident-related details captured during the initial dialog with the "911" caller, which can provide context for each institutional element and also provide context during the appropriate questioning sequence in the exemplary reporting system 370. For example, the automatic number information (ANI), caller ID, automatic location information (ALI), address of record, cellular coordinates, and so forth—as originating from a 911 call) can be incorporated into the exemplary reporting system 370 via actions/protocol management initiated by Connection/Web Service Manager module 330, to eliminate the need to solicit this basic data again from the caller. If the data is generated by the Institution(s) 300 in a web-based document/form, it can be polled by the Connection/Web Service Manager module 330, and the information forwarded to the exemplary reporting system 370.

While this description contains FIGS. which show "modules" without explicit hardware representations, it is understood by one of ordinary skill in the art, that these are computer-based systems that inherently contain a combination of computer-based hardware and transformative software processes, the transformative processes being described herein. Also, while FIG. 19 illustrates various architectural elements for use with an exemplary reporting system 370, it should be appreciated that other architectural elements may be added or the elements shown may be combined, distributed, layered, etc. according to design preference. Accordingly, having understood the precepts behind the exemplary reporting system 370, one of ordinary skill in the art may make various modifications or changes thereto without departing from the spirit and scope of this disclosure.

Figure 20:
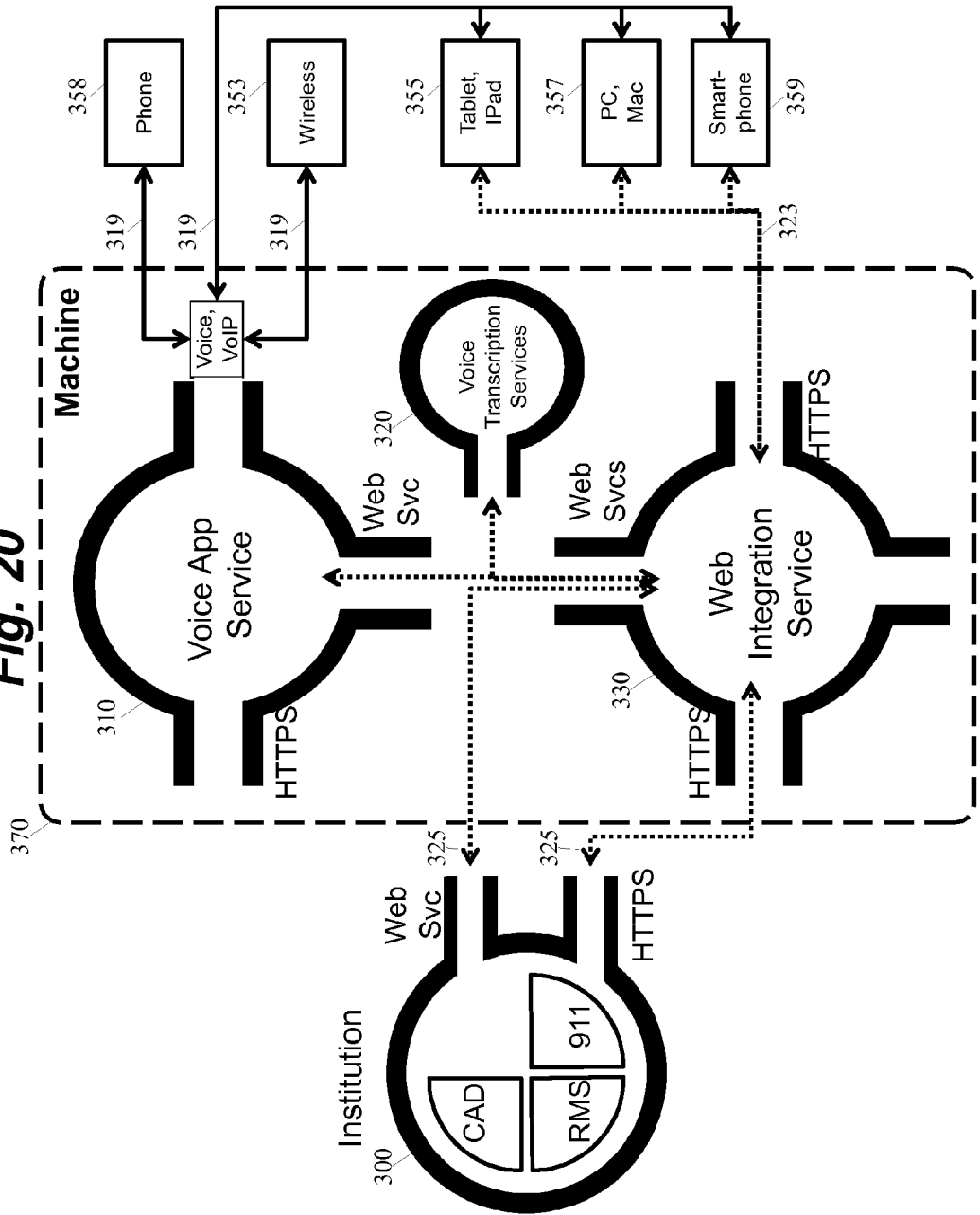
FIG. 20 is another a block diagram illustration showing another possible supporting architecture(s) for an exemplary reporting system.

FIG. 20 is another a block diagram illustration showing another possible supporting architecture for an exemplary voice reporting system 370. Generally speaking, integration with the Institution 300 and/or CAD systems is shown to exchange other incident-related details captured during the initial dialog with the reporting caller. That integration provides context for the appropriate questioning sequence in the Voice App Service 310. It also exemplifies Voice Transcription 320 by integration with external services. This may include computerized speech recognition, manual voice transcription services by another person, or some combination thereof. Information obtained from the reporting party by the voice reporting system 370 will also be available for transmission to the Institution's 300 CAD system or "911" system through a web service 325. This process enables information about an incident to be forwarded to responding officials via these systems in the event they are dispatched at some point after the reporting party has provided the initial input.

Specifically speaking, voice reporting system 370 contains three principal systems: Voice App Service 310, Voice Transcription Service(s) 320 and Web Integration Service 330. All three principal systems have direct or indirect communication channels to external systems such as Institution 300 and caller devices (phone 358, wireless device 353, Tablet 355, PC/Mac 357, and Smartphone 359). Of course, other devices not listed herein may be used according to design preference. Voice link 319 is used to connect any voice call to Voice App Service 310, and information is gathered from the caller via appropriate querying by the Voice App Service 310. "Web" link 323 is used to connect the Web Integration Service 330 to "computer-like" devices such as the Tablet 355, PC/Mac 357 and Smartphone 359, which provides web-like interaction to gather non-voice information from the caller. For security purposes, a HTTPS (or VPN or other secure) connection may be the connection of choice when interfacing via web link 323.

Information from either Voice App Service 310 and Web Integration Service 330 is forwarded to Voice Transcription Service(s) 320 for conversion into text. Information can also be obtained from Institution 300 for querying the caller or information obtained from the caller can be forwarded to Institution 300 (for example, a 911 call is detected). Institution 300 and its resources may contain data that assist in resolving the call-in. such as verification of address of the call-in. Institution 300 is linked to exemplary reporting service 370 via a network connection 325 such as HTTPS or a dedicated web services link Coordination of the call-in queries by the exemplary reporting system 370 and the automation capabilities provided by the various supporting systems result in an efficient report generating paradigm that can be implemented with little to no disruption to prior art call-in centers.

Figure 22:
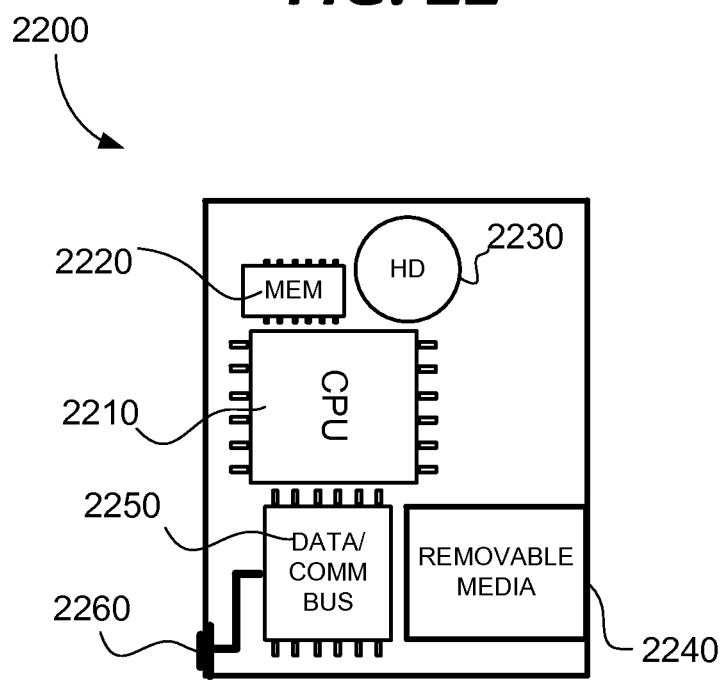
FIG. 22 is an illustration of a computer system suitable for use in the exemplary reporting system.

FIG. 22 is an illustration of basic hardware elements in a computer device/system 2200 suitable for use in the exemplary reporting system. The computer system 2200 contains a main processor/CPU 2210 communicating with discrete memory 2220 and/or hard drive memory 2230. The memories 2220, 2230 may be co-located with CPU 2210 (on same board) or on a separate platform (e.g., RAID). Software running on CPU 2210 may be stored in CPU 2210 and/or on discrete memory 2220 and/or hard drive memory 2230, as well as on removable media 2240. Data/Comm Bus 2260 provides communication pathways between various hardware elements and also to external systems (not shown) via path 2260. It is understood that FIG. 22 is a simple illustration, showing basic components of a computer and that computers may vary in many respects, according to design preference. For example, multiple CPUs, Buses, Memory may be utilized to increase performance, as well as specific hardware chips, such as networking, graphic processors and so forth. Accordingly, various modifications and changes may be made to computer system 2200 by one of ordinary skill in the art, without departing from the spirit and scope of this disclosure.

As will be appreciated by one skilled in the art, aspects of the present disclosure and of computer system 2200, described in FIG. 22, may be embodied as an apparatus that incorporates some software components. Accordingly, some embodiments of the present disclosure, or portions thereof, may combine one or more hardware components such as microprocessors, microcontrollers, or digital sequential logic, etc., such as processor 2210 with one or more software components (e.g., program code, firmware, resident software, micro-code, etc.) stored in a tangible computer-readable memory device such as memory 2220, 2230, that in combination form a specifically configured apparatus that performs the functions as described herein. These combinations that form specially-programmed devices may be generally referred to herein "modules". The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, and the like. A given module may even be implemented such that the described functions are performed by separate processors and/or computing hardware platforms. In addition, some embodiments of the apparatus may include a tangible computer readable medium 2240 containing instructions stored therein that when executed by a processing device cause the processing device to implement the methods as described herein.

Figure 3:
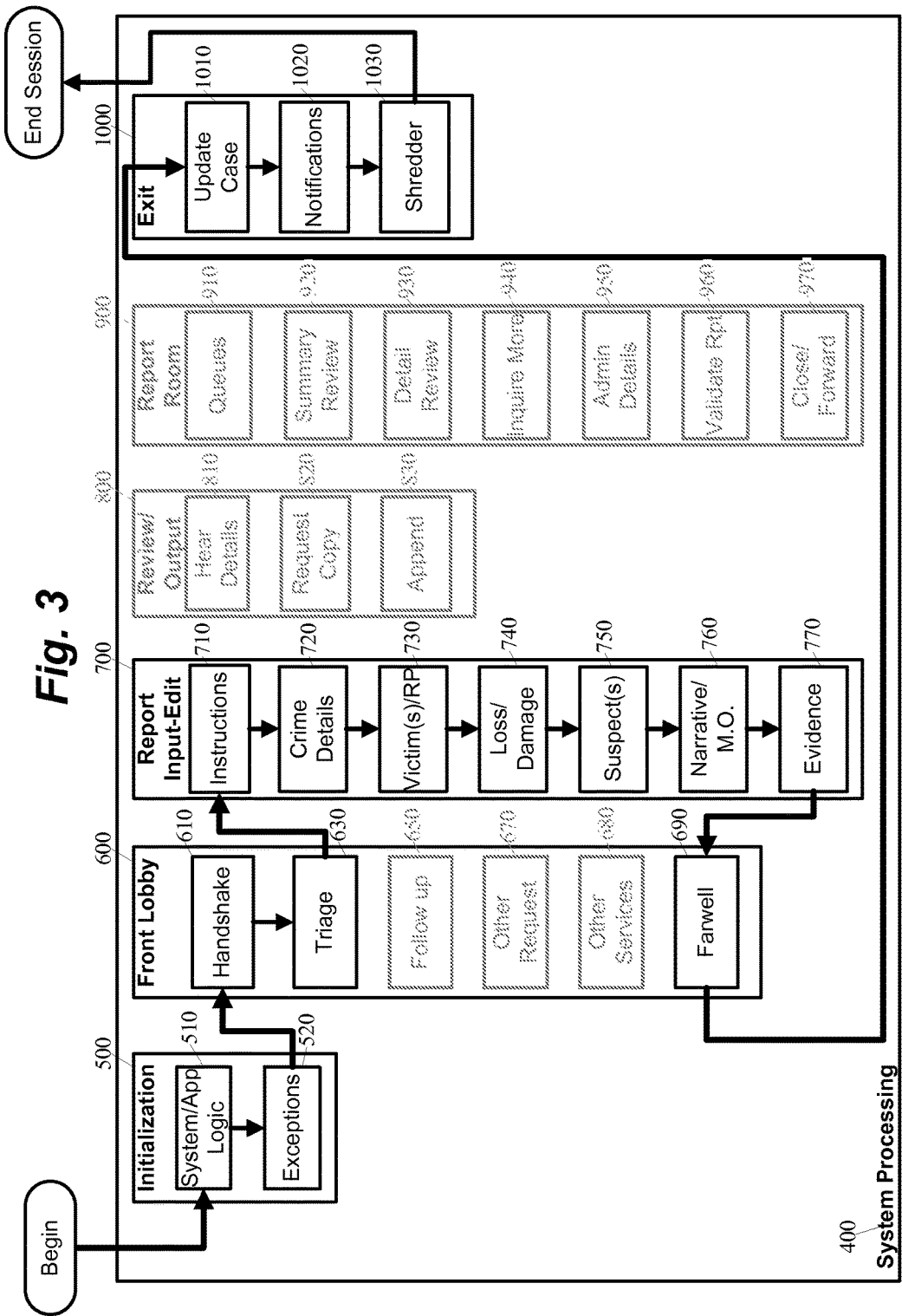
FIG. 3 is an illustration of an exemplary process through various system modules, in the context of a Robbery Report.

FIG. 3 is an illustration of an exemplary process through various system modules for managing an exemplary reporting system, as disclosed herein, in the context of a Robbery Report. Supporting this organization of system modules is one or more of the architectures described in FIG. 19-20, whereas the architecture(s) can be supported by computer systems and communication systems that are adapted to provide the linkages and capabilities described herein. Layering the system modules as described herein, provides for automation of various steps that were previously only possible through human/manual interaction, as well as enhanced reporting capabilities, while still providing appropriate levels of "control," as needed.

The following description of FIG. 3 will be cursory, the details of each system module being more fully explored in the ensuing FIGS. The illustrated System Processing 400 organization is configured in a context that mimics the operational nature of police services at a police station. Generally speaking, the exemplary process for the example of a Robbery Report begins with an Initialization module 500 that provides basic start-up/house-keeping management. After initialization for Exception 520 handling, the Front Lobby system module 600 engages and generally acts as salutations/initial caller assessment, involving questions presented to the caller, as deemed appropriate. The Front Lobby module 600 is the point of initial system contact with a reporting party. Handshaking 610 and Triage 630 forward the call handling to Report Input-Edit module 700 which obtains the details from the victim/reporting party. The Report Input-Edit module 700 and Review/Output module 800 serve as the service point for completing and obtaining a crime report.

The Report Room module 900 is isolated from citizens and is only available to officials who, for example, review reports, request more information or approve reports previously submitted, etc. The Exit module 1000 manages subsequent actions depending upon the status of the session and reports.

In Report Input-Edit module 700, subsequent to the collection of Evidence 770, a Farewell action 690 is triggered and the process can invoke the Review/Output module 800 or proceed to the Exit module 1000, where the case facts/information/data is updated 1010 and Notification 1020 is made to the appropriate individuals/organizations. Finally, Shredder module 1030 is invoked to remove or encrypt the report data. Involvement of the other system and/or sub-modules in the exemplary process is dependent upon the status of the current event.

Figure 4:
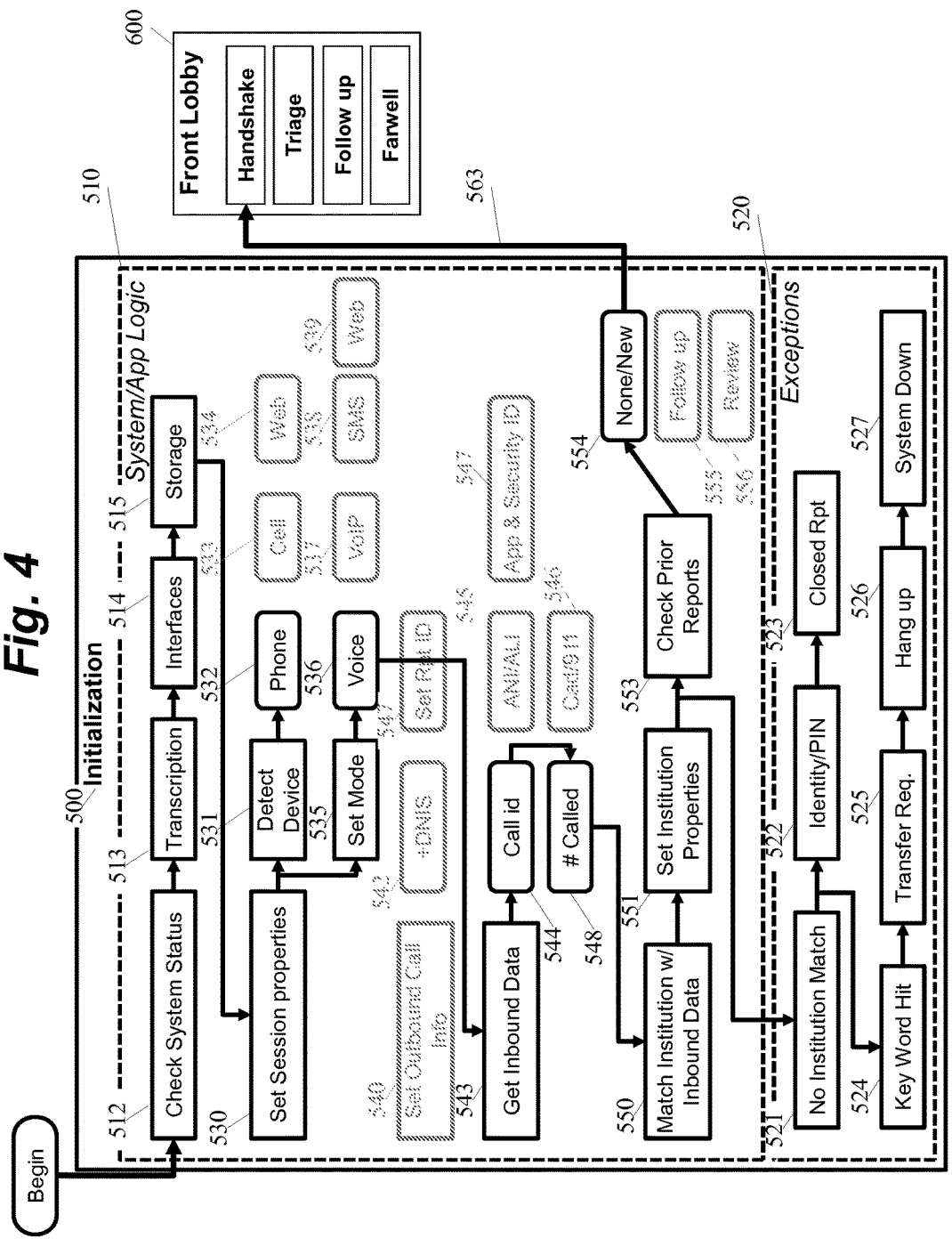
FIG. 4 is an illustration of an exemplary process flow associated with an "Initialization" module.

FIG. 4 illustrates and exemplary process flow associated with Initialization module 500 and its associated sub-modules (System/App Logic 510, Exceptions 520) and components. The Initialization module 500 can be used to automatically collect and prepare session specific data and parameters that control the system logic, application logic, and session-specific handling of exceptions. It may also determine what alternative modes of communication available (if any), prepare the alternative modes of communication, and may enable the transition to the alternate modes.

For example, System/App Logic sub-module 510 determines System Status Properties 512 to identify current availability of external Transcription services 513, Interfaces to other systems 514 and Storage resources 515. System Status Properties 512 can be periodically updated with the status of these sub-systems or updated upon polling. These property values are used during the session to optimize or limit the questioning sequences. Likewise, Session Properties 530 are captured here to further adapt the mode of communication and the questioning sequence based upon knowledge of the user's Device 531 and Mode of communication 535, having discrimination levels 532-534 and 536-539, respectively. Other devices and other modes are possible beyond those currently listed as alternatives become available.

The Detect Device 531 and Set Modes 535 sub-modules include steps to determine device capabilities and enable a transition to an alternate mode of communication with the system. Once the alternative mode, if needed, is established, or the original mode is selected, processing will continue with utilization of the device and mode specific parameters. For example, this FIG. depicts a system session that was initially established with a user with a landline telephone device.

Figure 21:
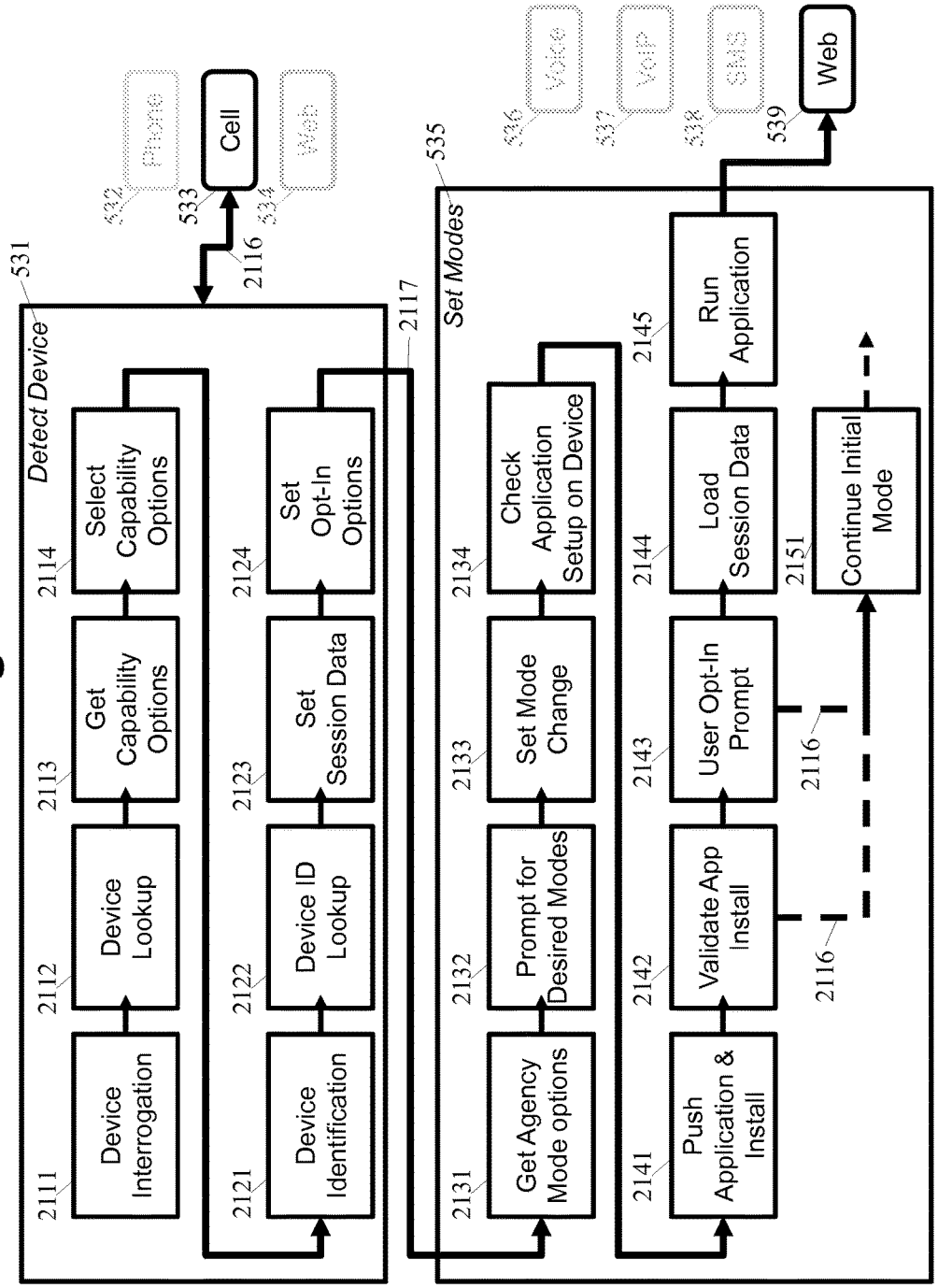
FIG. 21 is an illustration of exemplary processes used to detect/set modes for an incoming call/connection.

Referring now to FIG. 21, for one non-limiting example of possible processes/decisions in Detect Device 531 and Set Mode 535 sub-modules, when a cell or web connection is detected. Device Interrogation 2111 can be performed and a Device Lookup 2112 to further determine characteristics and capabilities of the user's device. Then Get Capability Options 2113 captures this data and the system Selects Capability Options 2114 can be utilized to further assess the capabilities of the device. Subsequent steps such as Device Identification 2121, Device ID lookup 2122, Set Session Data 2123 and Set Opt-In Options 2124, individually or aggregately, may be invoked, the respective steps being descriptively self-evident. For example, whether the user is calling in from a simple cell phone versus a smartphone can be determined via the Detect Device sub-module 531. The associated data is then captured into the session record.

Continuing, the Get Agency Mode Options 2131 sub-module establishes agency-specific controls on available modes, and is followed by a Prompt for Desired Modes 2123. The user may select one or more available modes and the Set Mode Change 2133 documents the selection. Upon the Check Application Setup on Device 2134, the system may then Push Application & Install 2141 a program on the selected device. Validate App Install 2142 will determine if setup was successful; and if unsuccessful 2116, the session Continues Initial Mode 2151. If Validate 2142 is successful, the User Opt-In Prompt 2143 follows and records user preference for the session. If the user does not Opt-In 2143, then Continue Initial Mode 2151 follows. Upon acceptance of Opt-in 2143, Load Session Data 2144 transfer's session specific data to the device via the alternative mode. Finally, the Run Application 2145 sub-module initiates the alternate application on the device and the session continues with the selected mode. For this example that alternate mode is Web 539 rather than the initial mode Voice 536.

A specific example of this process can be envisioned by a reporting party being prompted or requesting for continuation (or even initiation) of the report/call via an application that is either residing on his device or can be loaded onto his device. That is, the device application can be used to continue with processing the report at this stage. This option allows for users to use an application (aka app) or other software appliance that may be tailored to their device, allowing more efficient use of the hardware available. As one non-limiting example, a voice-controlled or voice-assistant application that utilizes a smart-phone's voice recognition capabilities can be downloaded to better replicate voice-to-text or text-to-voice questioning, or other automated question/response interactions. Of note is the recent use of voice-assistant applications that are resident on modern smart phones, smart devices. This would allow the exemplary system to exploit a device capability of the user's device to proxy the oral querying.

It should be understood that while the above FIGS. show the device application being relegated to interrogation, mode selection and session-data transfer, other capabilities that would benefit the exchange of information/processing/report formulation are contemplated and are understood to be within the spirit and scope of this disclosure.

Returning now to FIG. 4, when the mode of communication is voice 536, the system will trigger Get Inbound Data sub-module 544 (versus Set Outbound Call Info sub-module 540) to obtain Caller ID 544/Number called 548 and optional, Automatic Number Information and Automatic Location Information (ANI/ALI) 545, or CAD information 546 is captured to reduce the need for the reporting party to re-enter information that has previously been determined. App & Security ID 547 is used for capturing a unique identification code associated with the instance and version of the application being employed for the current user-session. A unique security identification code (specified by the user, or generated automatically during application install) may also be captured at this point. These codes are captured into the session specific records in order to enable user-specific authentication for subsequent sessions. It also provides a method for linking session activity to a specific device and/or user.

Further, a Match to Institution 550 is provided which dynamically determines which institution this reporting party is served by. In all cases, there are institution specific settings that can be set during initialization in the Set Institution 551, which may be facilitated by checking for earlier reports 553, None/New/Closed, Followup/Edit, and Review operations 554, 555, 556, respectively, are available for action based on the result of Check Prior Reports 553. Depending on the type of scenario this invention is applied to situation (e.g., insurance claim), these institution specific settings may be appropriately altered without departing from the sprit and scope of this disclosure.

For a None/New 554 status, and presuming there are no exceptions/faults that are detected in System/App Logic system 510, the exemplary process proceeds 563 to Front Lobby module 600 for appropriate "front lobby" processing which, in this example, entails general "handshaking."

Also illustrated as part of the Initialization module 500, Exceptions sub-module 520 initializes the exception-handling for various scenarios including: No Institution Match 521 and Key Word Hit 524. Key Word Hit 524 establishes how the system processes each occurrence of a pre-determined key word in the input from the reporting party. For example, if the word "shotgun" is received at any time during the session, an alert message can be immediately sent to an official and the exemplary process Transfers Request 525 to the appropriate party and Hangs up 526 with a subsequent System Down 527 or restart. Other parameters can be initialized that determine institution-specific handling of incomplete sessions, interrupted communications, and routing numbers for call-transfers.

Additional capabilities such as Identify/PIN 522, Closed Report 523 are provided in the event that workflow exceptions occur which require non-standard session handling. For example, when a session PIN 522 code provided is found to be invalid, the process may utilize an alternative method to associate this user and session to the correct incident previously created, such as the use of challenge questions, validation of personal data previously captured, or comparison of unique device or application identification codes. Another possible example of a workflow exception is when the current session is associated to a report record with a status code set to a Closed Record 523. In that case, the session will be restricted from further edits, available for read-only review, or branch to a supplemental report input module, if so permitted by the agency-specific settings.

Figure 5:
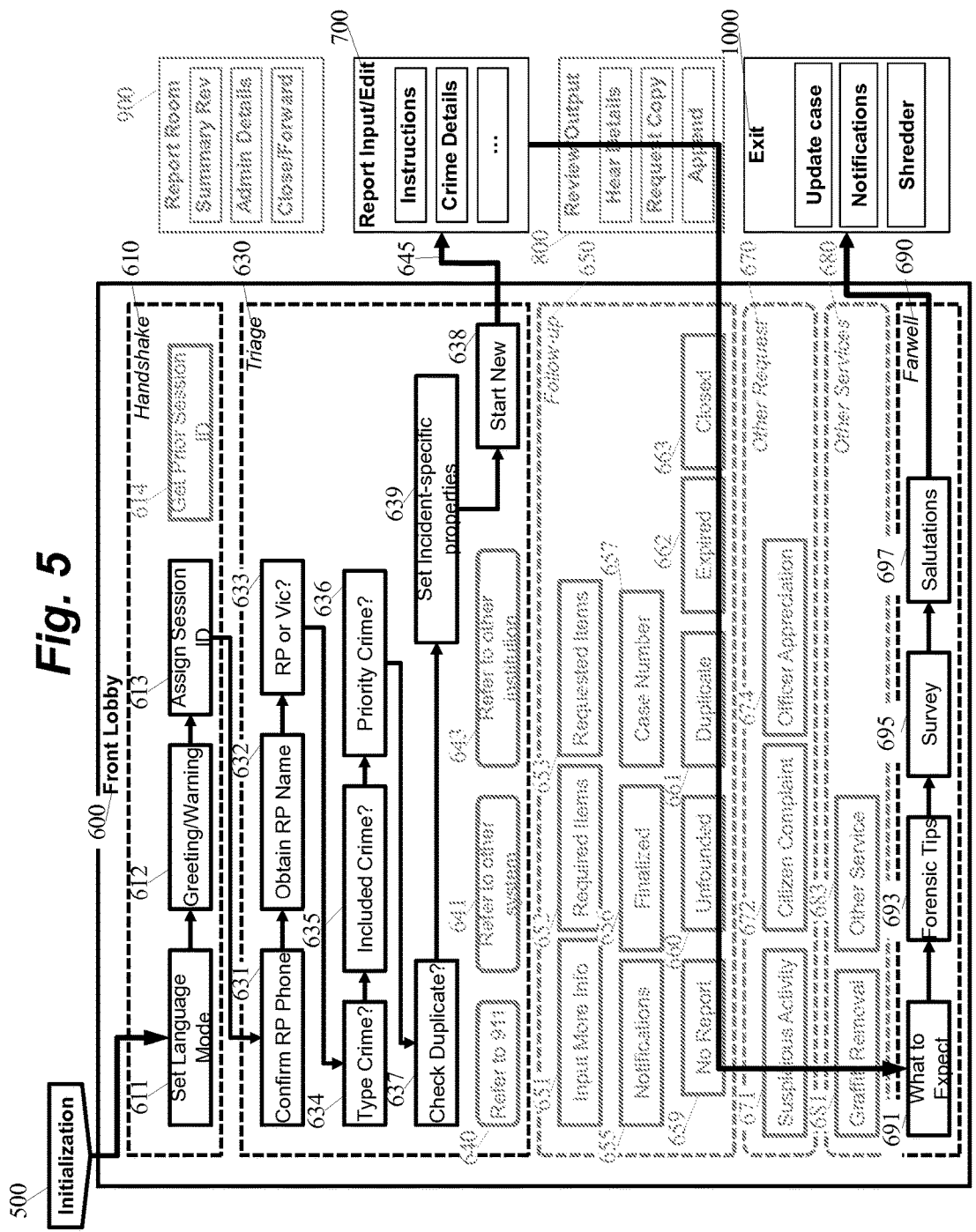
FIG. 5 is an illustration of various details of the "Front Lobby" module with associated sub-modules and components.

FIG. 5 illustrates the details of the "Front Lobby" module 600 with associated sub-modules and components. As stated above, the Front Lobby module 600 is the point of initial system contact with reporting party. The Handshake module 610 contains the Language 611 that enables dynamic configuration of the language used, or activation of logic in support of language-line services wherein a third-party joins the call to serve as an intermediate translator between the system and the reporting party. The Greetings and Warning 612 provides announcements and captures affirmation from the reporting party that information being provided is true and correct, along with provision for the user to exit the process. This component also can be adapted to, if so configured, to capture biometric data samples for unique caller identification and authorization.

Figure 6:
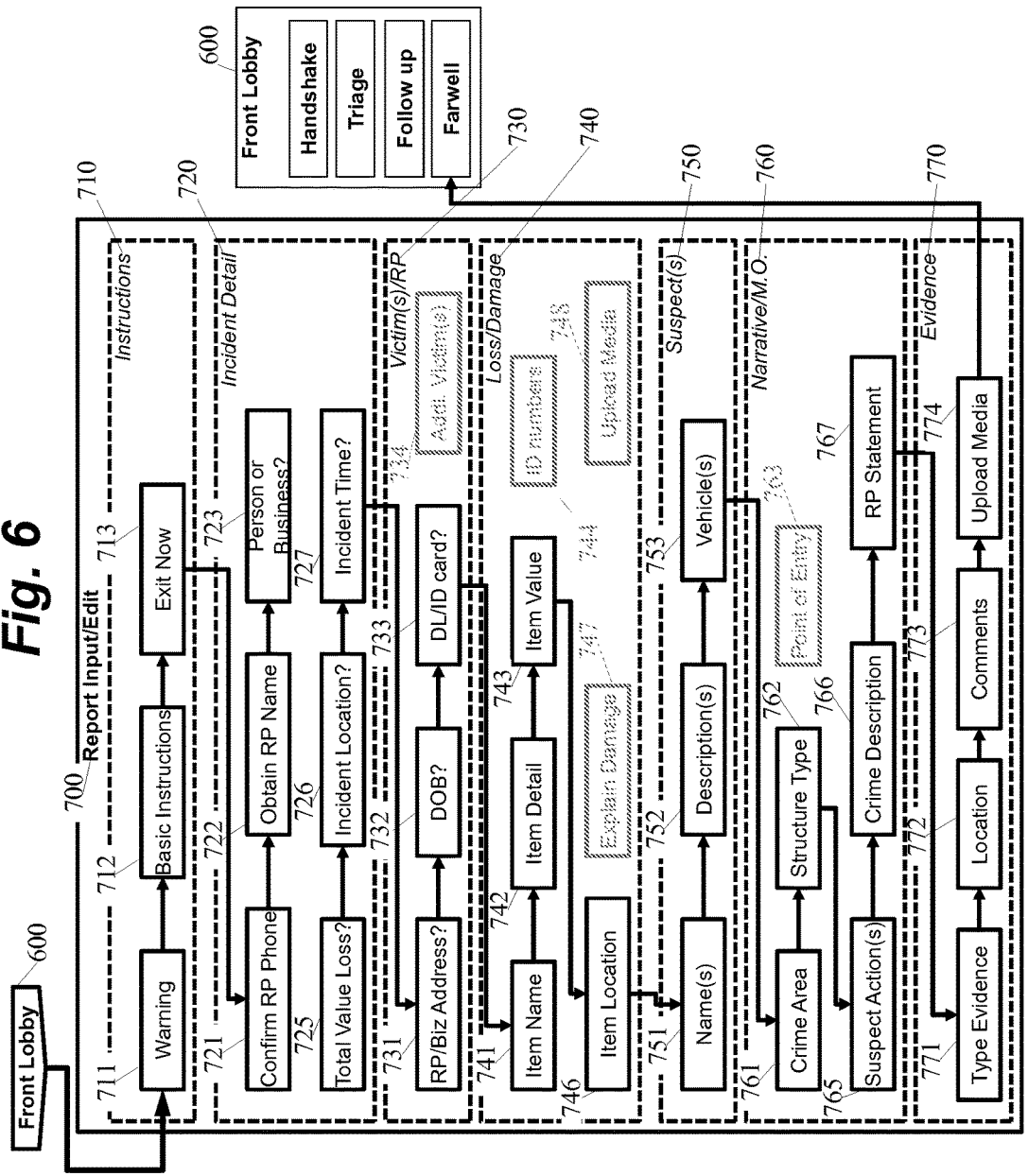
FIG. 6 is an illustration of a suitable embodiment of the Report Input/Edit module along with sub-modules containing questioning sequences that capture information from the reporting party.

In order to provide the reporting party access to their report in future sessions, the Assign Session ID 613 provides them with unique ID information. This is institution-specific and incident specific. Should the user have ID information already, they can provide it via the Prior Session ID/PIN 614 and the system will pre-load all current crime report data for their incident. In FIG. 6, the Handshake sub-module 610 can also utilize the Prior Session ID/PIN 614 entered by an official to gain access to the Report Room module 900.

FIG. 5 further illustrates the Triage sub-module 630, which is entered after Assign Session ID 613 is completed. Provided an existing/prior Session ID/PIN 614 is not found, the system will follow the process in the following sequence: Confirm RP Phone 631; Obtain RP Name 632; confirm if the user is the Reporting Party on behalf of the victim or is the Victim 633 of the crime; and the Type of Crime 634. These are key inputs for a crime report and must be successfully collected.

Given these basic items 631-634, the Triage sub-module 630 will use them to determine several things including: is this an Included Crime 635 in the types accepted by this institution using this system; if this is a Priority Crime 636 that requires an immediate response by an official; if this is a Duplicate 637 of crime report previously started or completed; if this is an emergency and the reporting party should be Referred to "911" immediately 640; if the incident report of this type for this institution is to be Referred to another system 641 (i.e., Graffiti Removal Hotline); or if the crime occurred in an area that is under the jurisdiction of another institution and should therefore be Referred to other institution 643. Once the Triage questioning sequence and logic is processed, and Start New 638 report is triggered, the flow proceeds 645 to the Report Input/Edit module 700 if the report is new or incomplete—or to the Report Review/Output module 800 if the report is complete.

If the Check Duplicate 637 module results in a match to a record that is incomplete, the process will proceed to the Follow-up sub-module 650 to enable completion of the existing report. The Follow-up sub-module 650 contains questioning items associated with a reporting party who: wishes to Input More Info 651; needs to provide more Required Items 652 not successfully captured during previous sessions; or must provide Requested Items 653 that an official needs in order to finalize the report. Additional capabilities provided in the Follow-up sub-module 650 can include enablement of the reporting party to complete follow-up actions for the same incident or prohibit further manipulation of the report.

The Follow-up sub-module 650 components also include Notifications 655 for the reporting party regarding the status of the report including: if the report has been Finalized 656; the issuance of a Case Number 657; if No Report 659 is warranted; if the report is Unfounded 660, Duplicated 661, or has been Closed 663. When an outbound session is initiated and the user has entered the valid session ID and PIN, they will be directed immediately to the Follow-up sub-module 650.

The Other Requests sub-module 670, includes methods for a user to submit: Suspicious Activity 671 (anonymously if desired); Citizen Complaints 672; or Officer Appreciation 674 comments. Availability of these options are institution-specific and Other Services 680 may be entered or dynamically set during session initialization. Non-limiting examples being Graffiti Removal 681 or Other Services 683, as according to design preference.

The Front Lobby 600 continues the conceptual analogy to an RP's communication with officials at the station by providing the Farwell sub-module 690. The reporting party who has entered a crime report into the system is further supported by being informed about What to Expect 691. This is context sensitive and anticipates the concerns of the reporting party. This also provides guidance on next steps, and pragmatic commentary about the type of crime they have been a victim of.

The Farwell sub-module 690 also enables reporting parties to receive Forensic Tips 693 that describe specific things they can do to identify facts or evidence that may support the investigation of the crime. It includes suggestions for locating stolen property, preventing re-occurrences or networking with neighbors to better detect criminal activity. The Survey 695 enables the user to provide feedback about the system and the police services they may have received. There can be other surveys made available from other institutions targeted toward victim services. The Salutations 697 gives final instructions and announcements prior to being disconnected from the current session via Exit module 1000.

FIG. 6 shows a suitable embodiment of the Report Input/Edit module 700 along with the sub-modules containing the questioning sequences that capture the crime report information from the reporting party. Initial entry into the system is depicted at the top of the figure in the Instructions sub-module 710, and continues down through subsequent sub-modules as determined by the type of crime specified. Each component represents one or more questions, the collection of recorded responses, decision-logic, data transfer, and session status updates. The Report Input-Edit module 700 and Review/Output module 800 can serve as the service point for completing and obtaining a crime report.

The Warning 711 is where the user is admonished regarding the legal consequences of providing a false or misleading crime report. Basic Instructions 712 are also provided and the user may Exit 713 the system at this point if desired without creating a crime report.

Should the user continue, the Incident Detail sub-module 720 will first Confirm RP Phone 721 to obtain the best contact number for return calls and an optional email address. If the user is reporting on behalf of a business or institution, the system will Obtain RP Name details 722 and the name of the Business 723. For crime types that involve damage or loss, the Total Value Loss 725 obtains the total monetary sum of all items associated with the incident. The Incident Location 726 is then captured as well as the Incident Time 726 and date. Incident Detail sub-module 720 question items may be bypassed after employing data received during the initial session connection (caller ID, ANI, DNIS), or may proceed to prompt the user for information if needed. Additional information is then captured in the Victim(s)/RP sub-module 730 to include: RP Address 731; Date of birth 732; Driver's License or ID card 733; as well information about Additional Victims 734.

The module Report Input/Edit 700 then captures the details about items that were taken or damaged in the Loss/Damage sub-module 740. This part of the questioning sequence is iterative enabling the user to provide details on multiple items. In addition to Item Name 741, Item Details 742, Item Value 743, Identification Numbers 744, Item location 746, this sequence also captures the Explanation of damage 747 (if appropriate) and also enables Upload of Media 748 (images, video, etc.) for each item.

The Suspect(s) sub-module 750 depicts the suspect information question sequence including the Names 751, Descriptions 752, location of possible suspects or suspect Vehicles 753 associated with the crime. Information on multiple suspects can be accepted.

In the Narrative/M.O. sub-module 760, the question sequence is determined by the system depending upon the type of crime and session information. For burglary, the Structure Type 762 and Point of Entry 763 are included. Most other crimes also include the Crime Area 761, Suspect Actions 765, Crime Description 766 and the RP Statement 767 (if appropriate) that captures what happened.

The sub-module Evidence 770 follows the sequence of questions regarding any physical evidence that may be known to the RP including: Type of Evidence 771; the Location 772 of the evidence; Comments 773 about nature of or details about the item. Finally, here too the Upload Media 774 enables submission of images, video or other media related to the evidence. Once the required responses are received, the flow returns to the Front Lobby module 600.

Returning to FIG. 5, the progression can resume through the Farewell sub-module 690. The previously determined incident type is then employed in the What to Expect 691 that provides context-specific details about how the institution will respond and what additional steps the RP may be required to complete. Forensic Tips 693 then examines information previously collected from the RP and provides context-specific guidance on observing and collecting additional evidence, and suggestions regarding recovery of property, as one of many possible examples.

An optional Survey 695 enables the RP to complete one or more surveys. Finally, the system can provide institution-specific Salutations 697 to the RP. For this example, the computerized interaction with the RP is complete at this point and processing continues 647 to the Exit module 1000.

Figure 7:
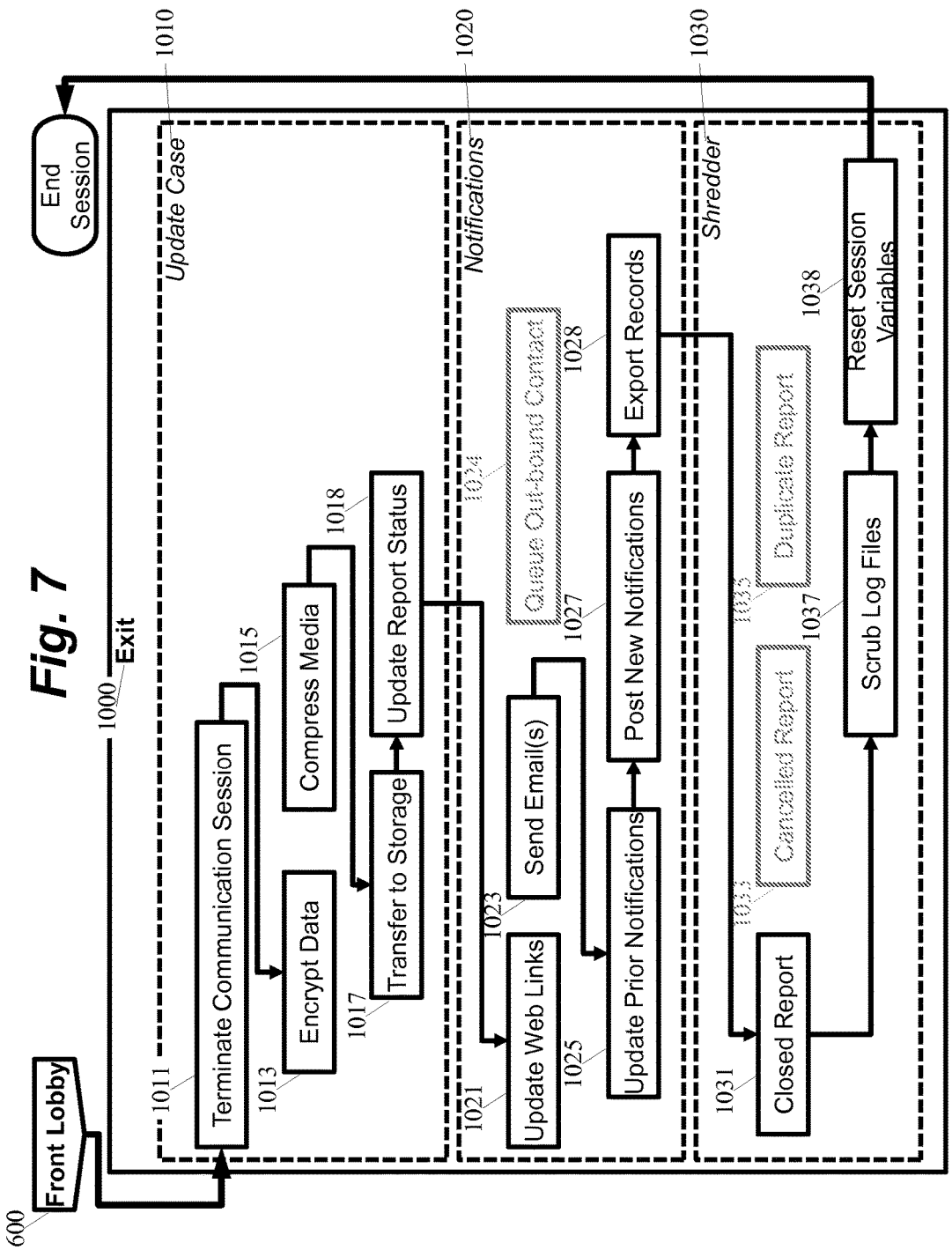
FIG. 7 is an illustration of various mechanisms in the Exit module.
Figure 11:
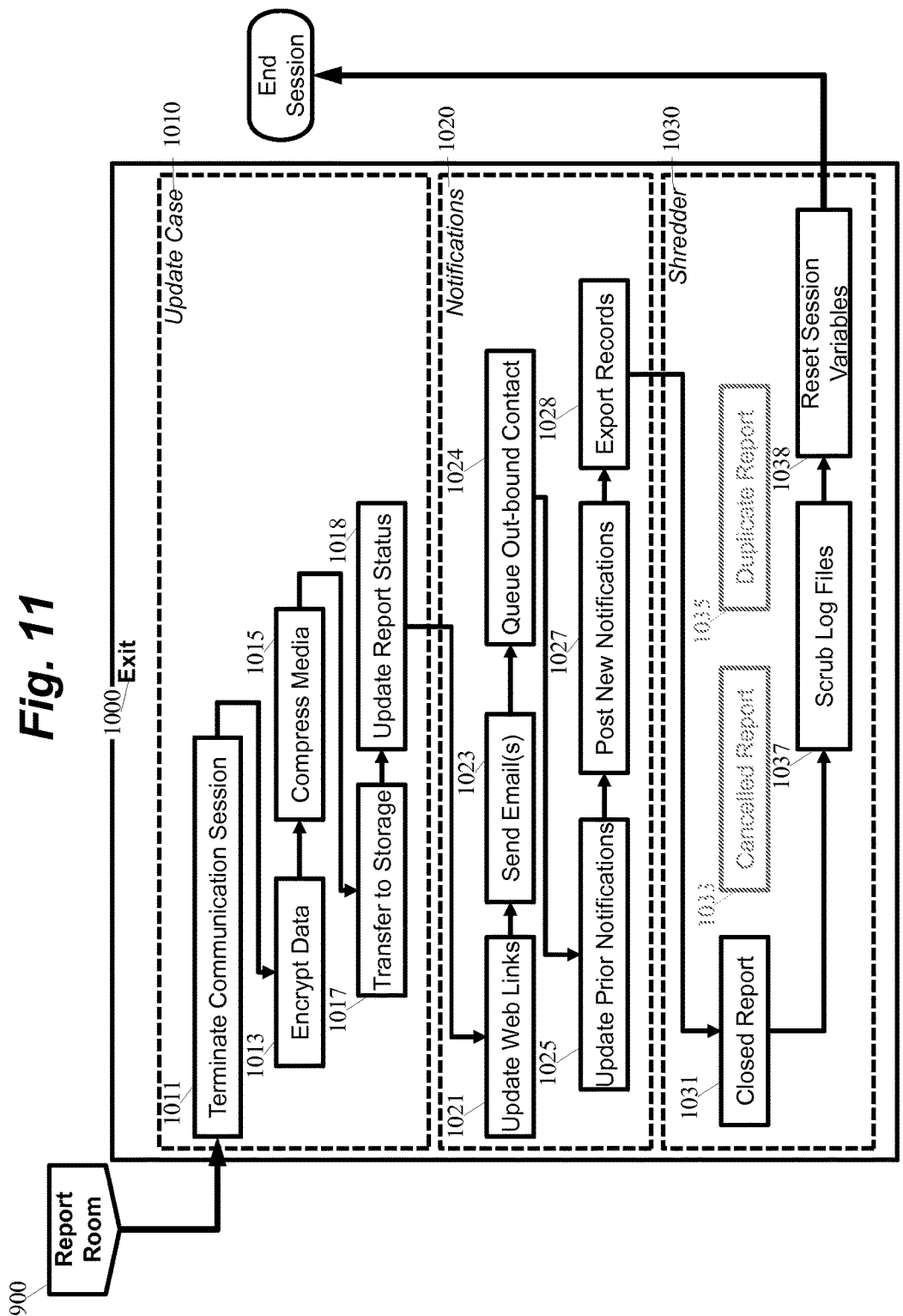
FIG. 11 is an illustration of the Exit module and sub-modules in the context of an Official reviewing the report.
Figure 15:
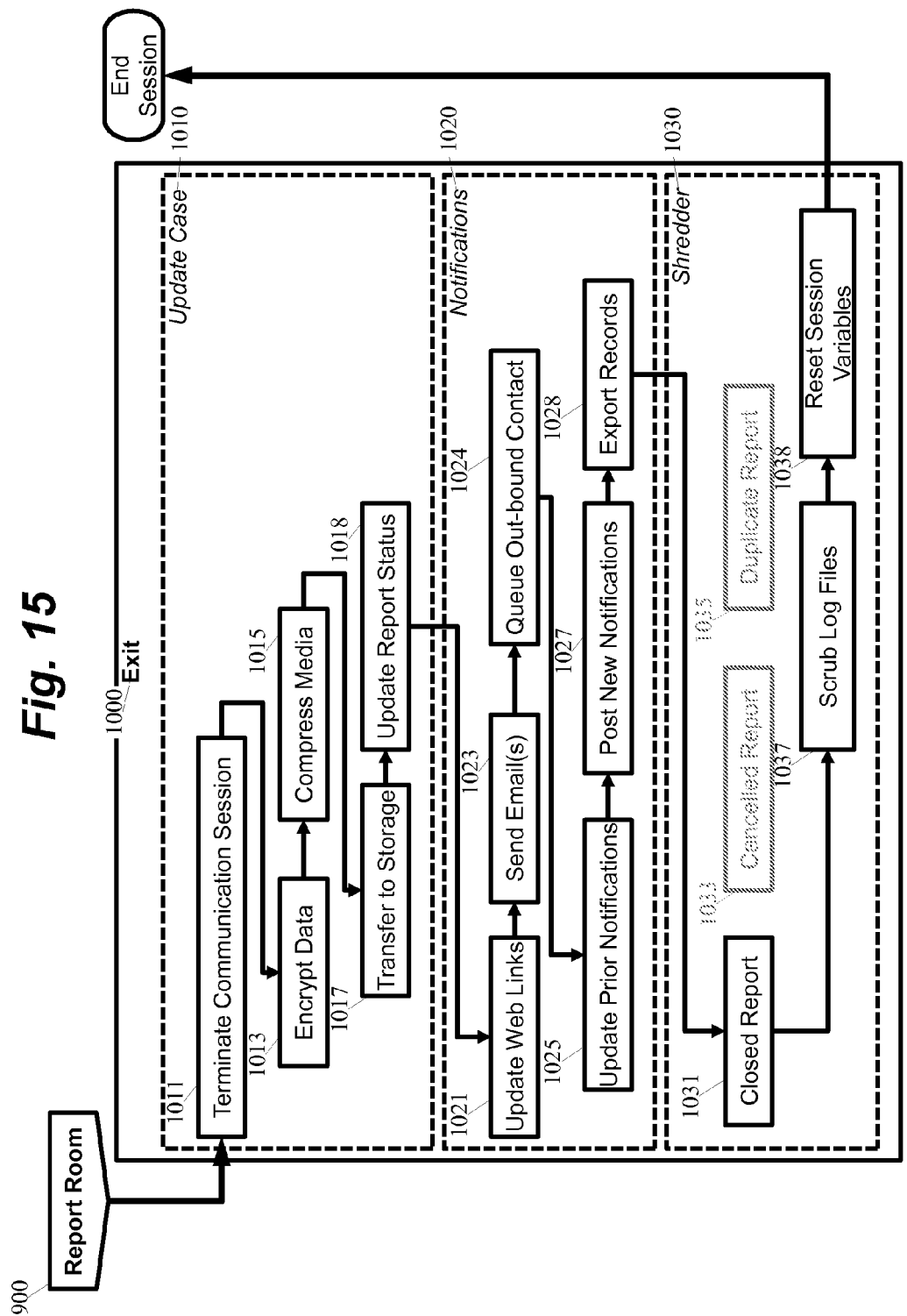
FIG. 15 is an illustration of the Exit module in the context of a reporting party following up on a previous report.

FIG. 7 describes mechanisms in the Exit module 1000, which are also repeated in FIGS. 11 (official review of report) and 15 (reporting party follow up). Details of the Exit module 1000 are fully presented in the description of FIG. 15, provided below. FIG. 7 is presented here to shown one scenario where a robbery report is being entered by a reporting party, and the session is terminated with required steps being completed to close the session and exit the system.

Figure 8:
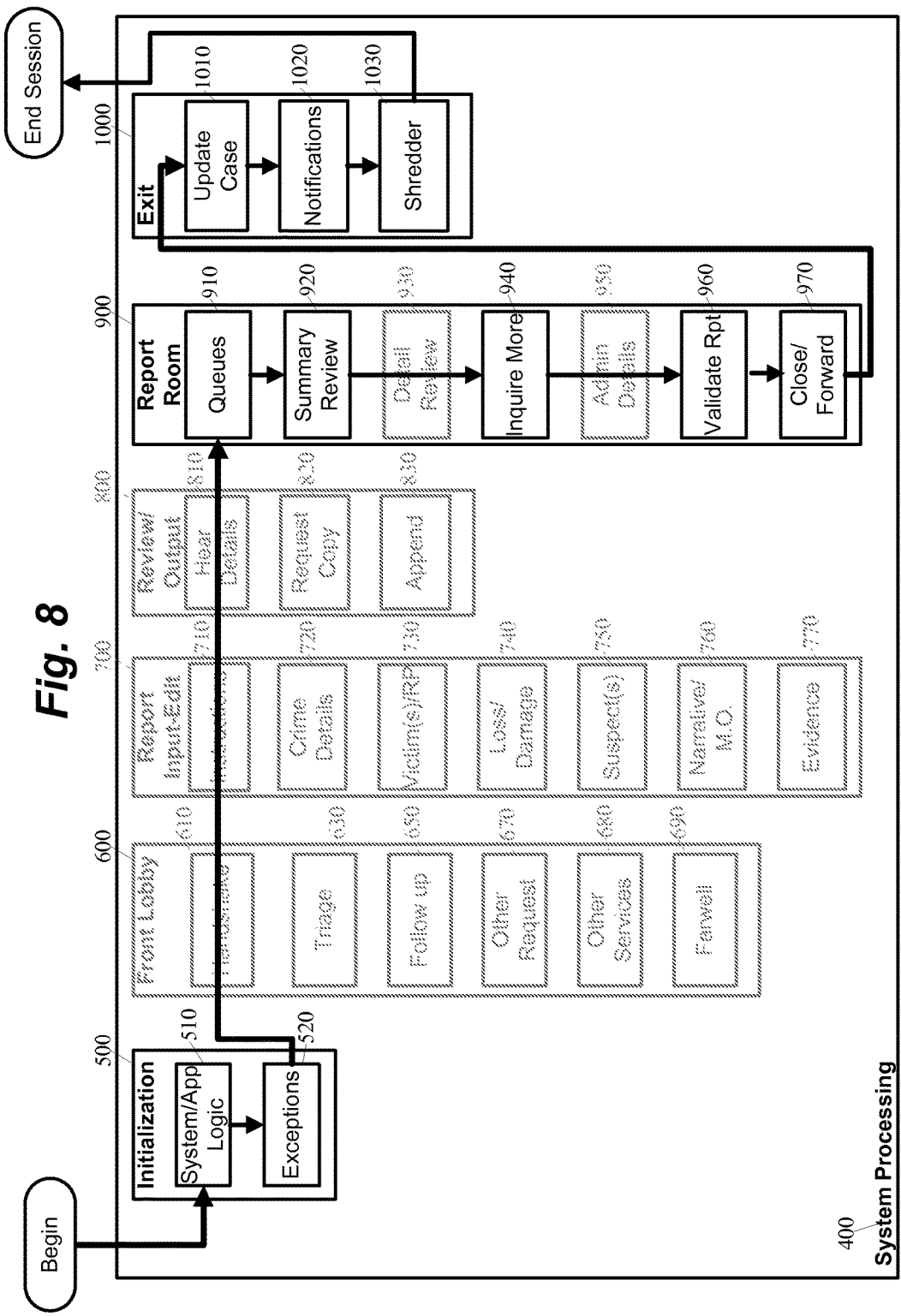
FIG. 8 is an illustration of an alternative progression through various top level modules in the context of an official's review.

FIGS. 8-11 show an alternative progression through Initialization module 500, continuing to Report Room module 900, then to Exit module 1000 in the context of an Officer (for example, official or supervisor) review. In FIG. 8, when an "official" is requesting a review of the report, Report Room module 900 is invoked, the processes of which are detailed in FIG. 10. After completion of the Report Room module 900, the process goes to the Exit module 1000, which is fully detailed in FIG. 11. Many aspects shown in FIG. 8 are self-explanatory or detailed in the following FIGS.

Figure 9:
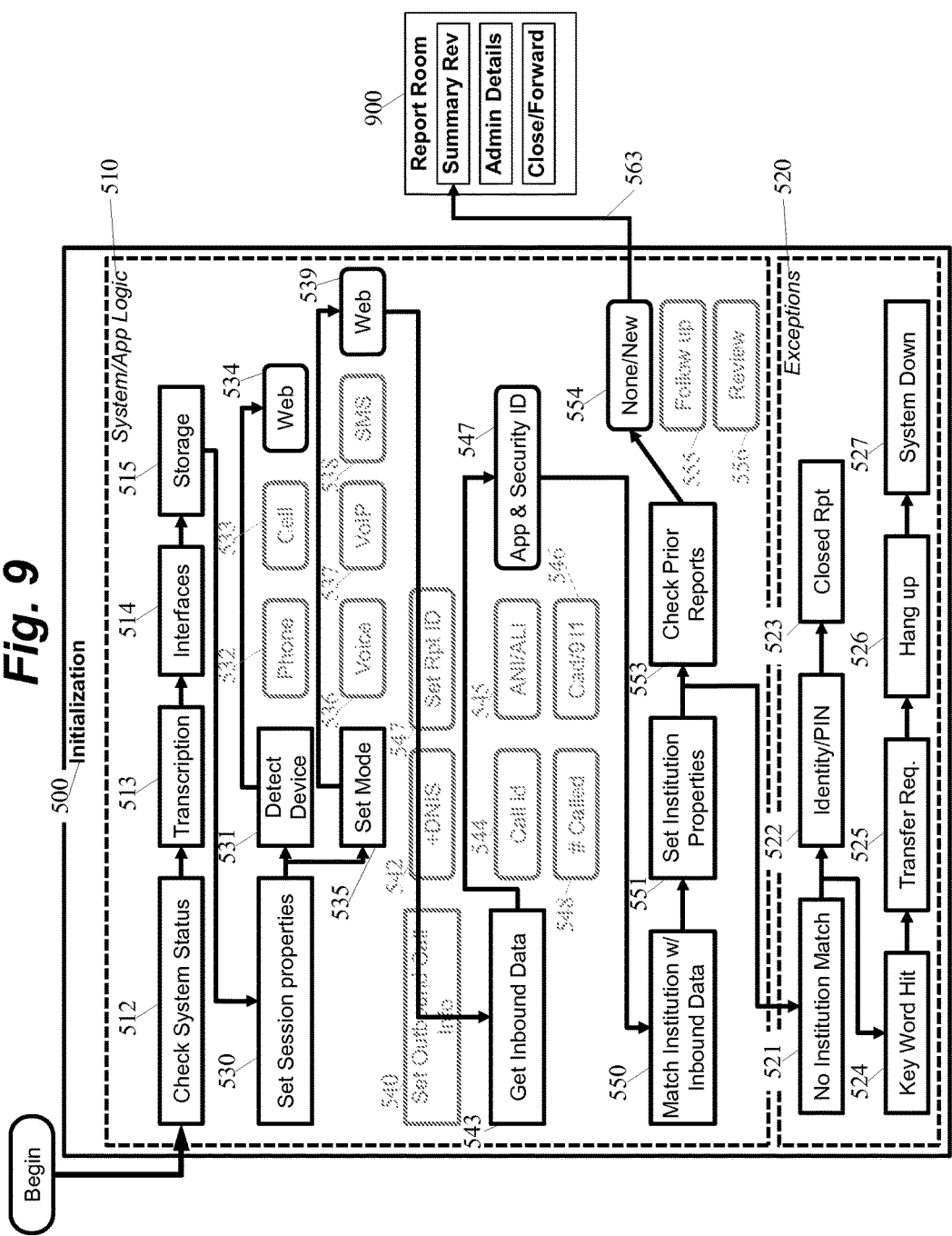
FIG. 9 is an illustration of another example of the Initialization module, where the caller is identified as an authorized official rather than a reporting party

FIG. 9 is an illustration of another example of the Initialization module 500, where the caller is identified as an authorized official rather than a reporting party. In this scenario, a web based device is detected 534, 539 and the official's security code or access is vetted 547. The process proceeds along similar paths as described in FIG. 4, therefore no additional discussion is deemed necessary.

Figure 10:
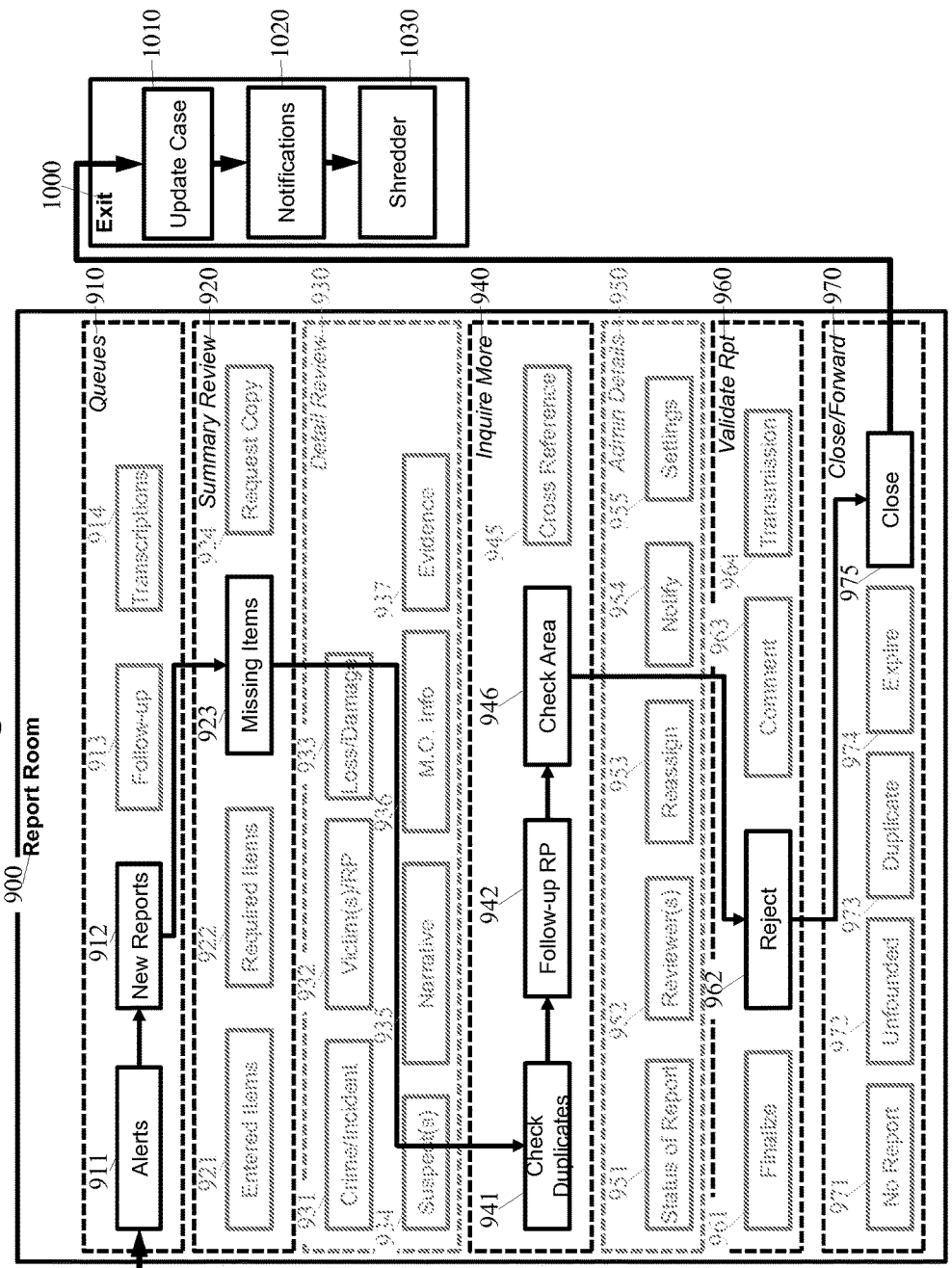
FIG. 10 is an illustration of the Report Room module along with the sub-modules containing the tasks officials will perform, when reviewing/inputting into the report.

FIG. 10 is an illustration of the Report Room module 900 along with the sub-modules containing the tasks officials will perform (per FIG. 8's arrangement) associated with crime reports entered into this system. Officials may utilize this module using voice or a web-based application. The Queues sub-module 910 provides the entry point for officials after processing through the Initialization module 500. The Alerts 911, provides access to any priority messages such as would be generated from hits on key word searches in responses. New Reports 912 can be queued up for review based on Alerts 911 results. The Follow-up 913 enables access to reports that have been previously reviewed for which additional reporting party input has been received; items targeted for follow up can be processed.

The Transcriptions 914 enables officials to complete manual transcription of any items in the system pending transcription and the items are ranked by relative priority. The queue of transcription items is inclusive of all those associated with the crime reports for that institution.

The graphical interface of the Transcriptions 914 enables the official to view the question item details and listen to the recording collected from the reporting party. The official can then repeat what they heard into the system which then uses automated speech recognition (ASR) that has been trained for their voice to generate the text from their voice recording. The result is displayed with the option to score the transcription, designate the need for confirmation from the reporting party, or to approve the transcription. Other options include the ability for any system-based follow-up with the reporting party to be dependent on a series of modified questions as specified by the official. The exemplary system can be designed to pre-designate incident types along with required and optional elements needed to fully complete the report; as well as dynamically generate a listing of required report information not yet received successfully; and/or automatically field-level compare a selected report to other reports to find, visualize and enable a merge of data from duplicate incident reports; and/or supplementally notify the existence of key words or phrases with a suggested action.

Transcriptions 914 also displays the responses to all other question items in the same sub-module and component for that crime report. For example, in the Victim(s)/RP sub-module 730 (seen in FIG. 6), the DL/ID Card 733 may include question items for "State", "ID type" and "ID number." When "ID number" is in the queue for transcription, the user can be shown responses to all three items to better aid in establishing the context for the item being transcribed.

When the New Reports 912 is accessed and a report is selected, the official is then provided the option of Summary Review 920 tasks including: exclusive review of Entered Items 921; review of Required Items only 922; the required items that are Missing 923; or to Request a Copy 924 of the report via email or via other output options.

The Detail Review sub-module 930 provides selective access to the report content organized into major divisions: Crime/Incident 931; Victim(s)/RP 932; Loss/Damage 933; Suspect(s) 934; report Narrative 935; Modus Operandi (M.O.) Information 936; and Evidence 937.

The Inquire More sub-module 940 provides methods for further interaction with the reporting party, or use of other resources to investigate the crime report in greater detail. The system provides a Check Duplicates 941 that searches for other incidents within the system that match details of the selected report based upon items such as location, time of incident, or suspect information. When duplicate reports are identified, the official is able to consolidate items between reports.

When appropriate, the user may create a Cross-Reference 945 between two or more incidents in the system. The official can also utilize the Follow-up with RP 942 to solicit more information from the reporting party. This may include initiation of an outbound phone call to the reporting party by the voice application, an email message, or text message.

The Check Area 946 contains options to search external records or crime database systems for possible matches to the details of the selected report. Results are presented to the official showing the correlation.

The Admin Details sub-module 940 provides administrative information about the selected report including one or more of: Status of the Report 951; an option to Reassign 953 ownership to another official; or Notify 954 another official (such as a criminal investigator) via email with the selected report forwarded as an attachment.

The Settings option 955 enables access to a graphical interface to administer the institution specific settings in the system. A secondary username and ID are required for access to this component.

The Report Room module 900 can also contain sub-modules Validate Report 960 and Close/Forward 970 that enable the official to ultimately approve or reject the crime report and Finalize 961 tasks on the selected report. Each component requires input by the official to properly document the action(s) taken. The Comment 963 enables the official to communicate the outcome of the crime report to the RP with the option to select pre-defined phrases or manually enter the desired comments. The Transmission 964 of the final outcome can be communicated to the reporting party by the official using the voice system, email, instant message, or text message. The official status is set when a report is Closed 975 and may include: No Report 971; Unfounded 972; Duplicate 973; or Expired 974. After Closed 975, the process proceeds to the Exit module 1000.

FIG. 11 is an illustration of a suitable embodiment of the Exit module 1000 and sub-modules that handle session termination procedures and system functions including: Update Case records 1010, Notifications 1020 and the Shredder 1030. FIG. 11 shows the Exit module 1000 in the context of an Official reviewing the report. The Terminate Communications Session 1011, closes the system's connection to the user, and the processing continues with one or more additional steps including: Encrypt Data 1013, Compress Media 1015, Transfer to Storage 1017 and Update Report Status 1018, the functions of the component steps being self-explanatory.

The Notifications sub-module 1020 processes the transfer of information to concerned parties and other external systems. Update Web Links 1021 updates URL addresses to media attachments and report summaries. Any email messages and instant messages are processes in the Send Email (s) 1023. Update Prior Notifications 1025 updates or removes prior notifications posted for this report while Post New Notifications 1027 send new Notifications to the appropriate queues. The Export Records 1028 manages the transfer of the report to the institution's system (i.e., RMS) if appropriate.

The sub-module Shredder 1030 performs cleanup of report records depending upon the status of the report. If this is a Closed Report 1031 all data for this crime report is removed from system storage and log files. A Cancelled Report 1033 is retained but flagged for removal after a period designated by the institution. When a Duplicate Report 1035 is encountered during processing, this component will remove duplicate data from storage and logs. The Scrub Log Files 1037 will ensure no personal or sensitive data is retained on the system for this session. Finally the system will Reset Session Variables 1038 to end the session.

Figure 12:
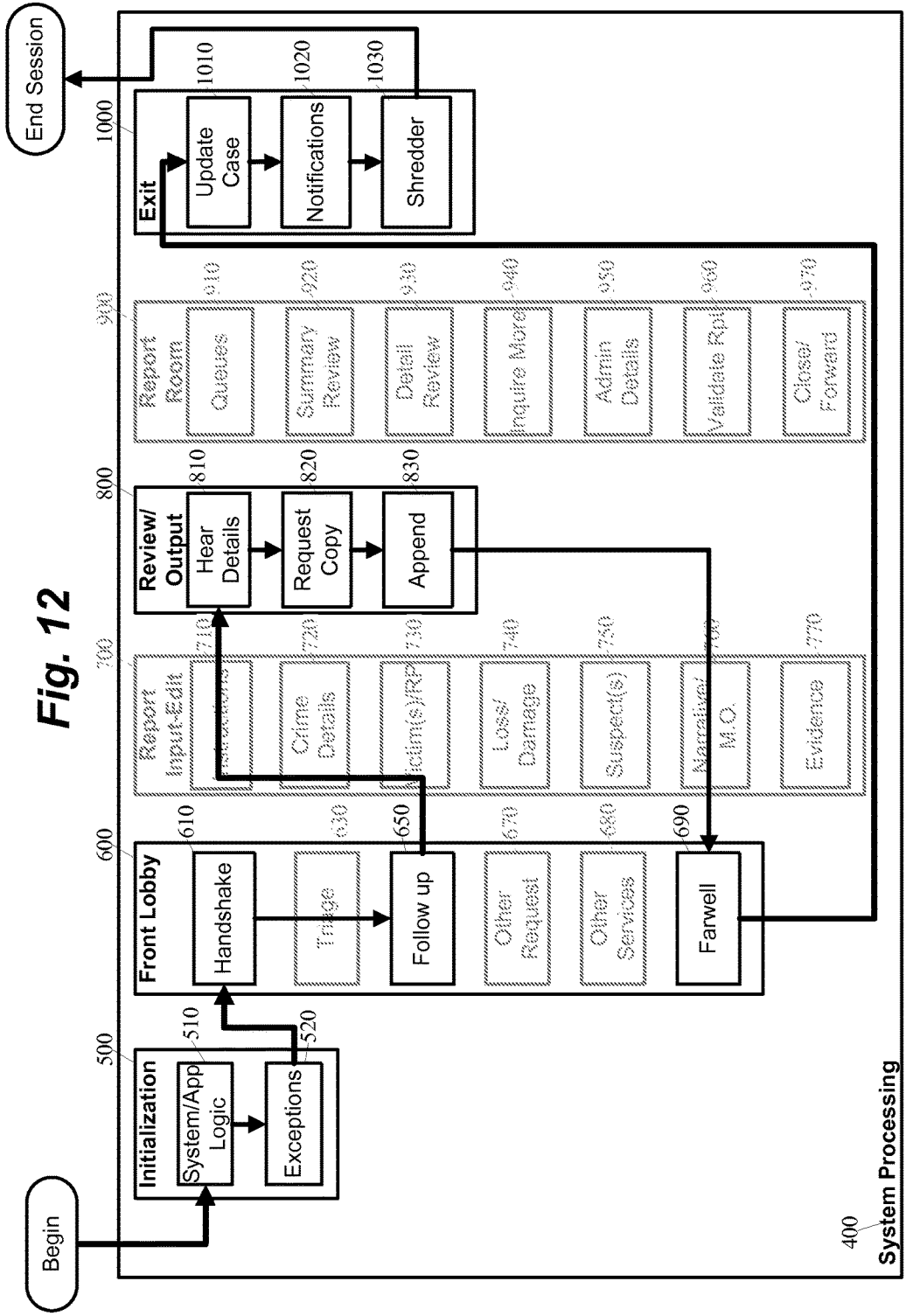
FIG. 12 is an illustration of the System Processing system where the reporting party has completed an initial call-in and is following up to provide additional details (and/or to allow the request a copy of the report).

FIGS. 12-15 detail an RP follow-up session processing, after the initial call-in report, from Initialization module 500, to Front Lobby module 600 (Follow-up sub-module), then to Exit module 1000. Aspects of this progression are provided below/above, many features being self-explanatory. FIG. 12 shows the System Processing system 400 where the reporting party has completed an initial call-in and is following up to provide additional details (and/or to allow the request a copy of the report). Follow up may be initiated by the exemplary system, via a call, email, text, etc. to the reporting party. Initialization module 500 processes the call/contact and forwards to the Front Lobby module 600 which determines that the caller is a prior reporting party and sends the call to the Follow-up sub-module 650 for appropriate transfer to the Review/Output module 800, based on the caller's information. Review/Output module 800 then queries the caller for the additional details and Hears Details sub-module 810 processes the added information. If the caller requests a copy, then Request Copy sub-module 820 is invoked and the heard details are Appended 830 to the report. The process then transfers to Farwell sub-module 690 in the Front Lobby module 600, where the system proceeds to the Exit module 1000.

Figure 13:
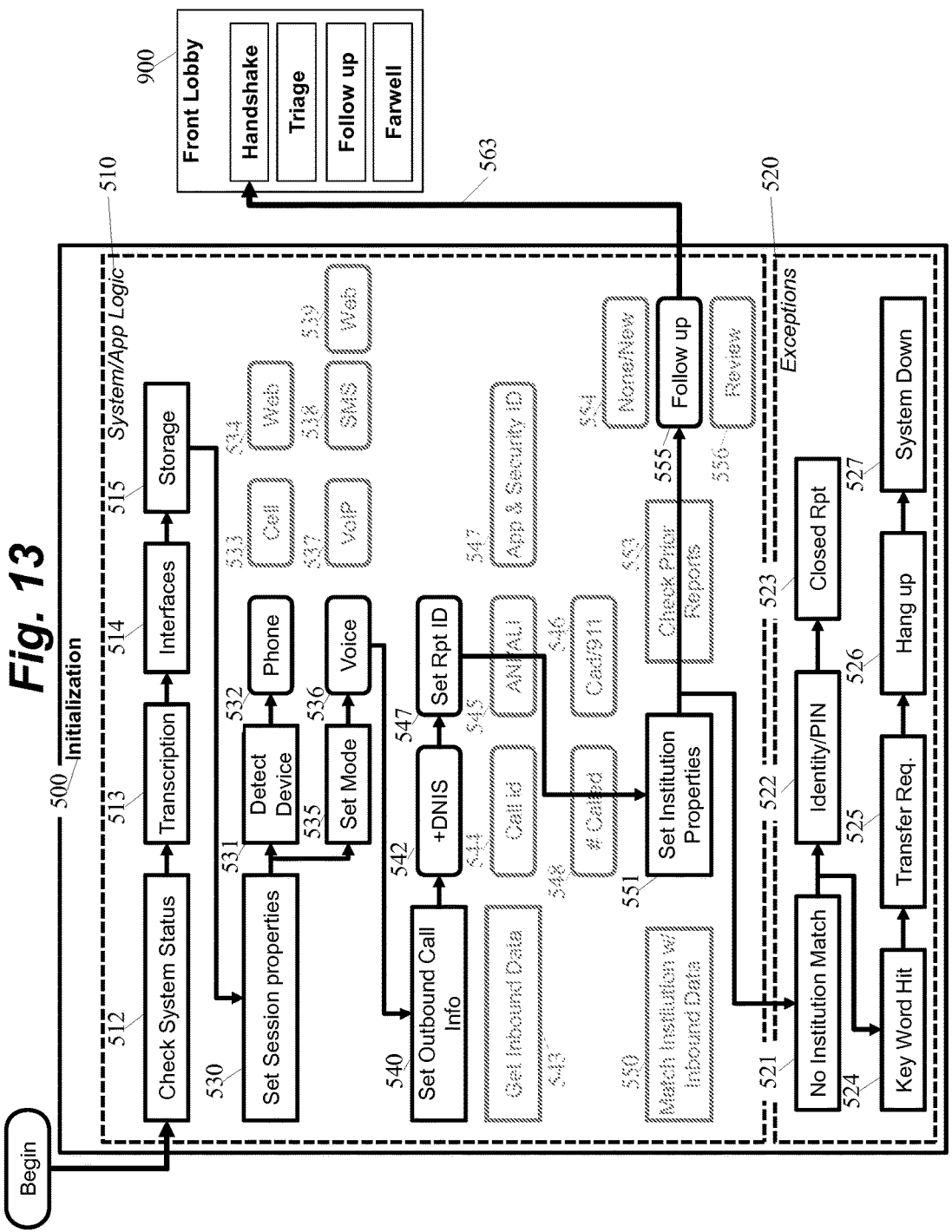
FIG. 13 is an illustration of the Initialization module and the paths taken for a reporting party during a follow up.

FIG. 13 is an illustration of the Initialization module 500 and the paths taken for a reporting party during a follow up. Contrary to the previous paths seen in FIGS. 4 and 9, an Outbound Call 540 is invoked to contact the prior reporting party. A Follow up 555 status is flagged and the Initialization module 500 transfers to the Front Lobby module 900, which performs the additional querying/follow up questions.

Figure 14:
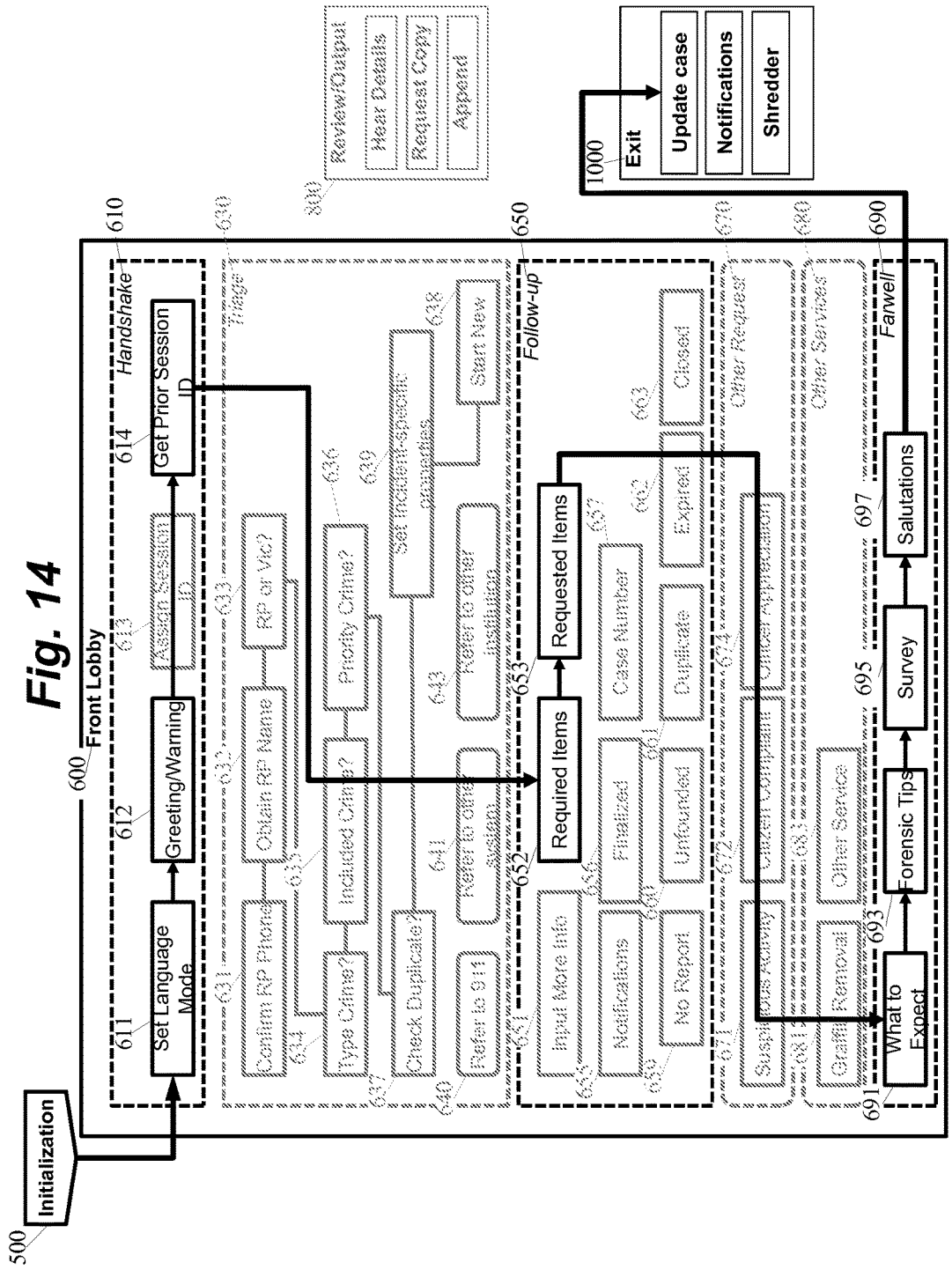
FIG. 14 is an illustration of the Front Lobby module steps when a follow up is performed.

FIG. 14 is an illustration of the Front Lobby module 600 steps when a follow up is performed. In contrast to the former Front Lobby module 600 path seen in FIG. 5, the Get Prior Session ID 614 sub-module 614 is invoked, correlating this exchange with the reporting party to a prior report. Then Required Items 652 and Requested Items 653 are cycled through to obtain additional information as seen in steps (691, 693, 695, 697) of Farwell sub-module 690. Upon completion of the Salutations 697, the process proceeds to the Exit module 1000.

FIG. 15 illustrates a suitable embodiment of the Exit module 1000, as entered via Report Room module 900, shows sub-modules that handle session termination procedures and system functions including: Update Case records 1010, Notifications 1020 and the Shredder 1030. FIG. 15 shows the Exit module 1000 in the context of a reporting party following up on a previous report. Terminate Communications Session 1011 closes the system's connection to the user, and the processing continues with additional steps including: Encrypt Data 1013, Compress Media 1015, Transfer to Storage 1017 and Update Report Status 1018, these functions being self-explanatory.

Next, the Notifications sub-module 1020 processes the transfer of information to concerned parties and other external systems. For example, Update Web Links 1021 updates URL addresses to media attachments and report summaries. Any email messages and instant messages are processed in Send Email(s) 1023 and queued/connected to contact information via Queue Out-bound Contact 1024. Update Prior Notifications 1025 updates or removes prior notifications posted for this report while Post New Notifications 1027 sends new Notifications to the appropriate queues. The Export Records 1028 manages the transfer of the report to the institution's system (i.e., RMS) if appropriate.

After completion of Notifications sub-module 1020, the sub-module Shredder 1030 performs cleanup of report records depending upon the status of the report. If this is a Closed Report 1031, all data for this crime report is removed from system storage and log files. A Cancelled Report 1033 retains the report, but is flagged for removal after a period designated by a respective institution. When a Duplicate Report 1035 is encountered during processing, this component will remove duplicate data from storage and logs. The Scrub Log Files 1037 process will ensure no personal or sensitive data is retained on the system for this session. Finally the system will Reset Session Variables 1038 to end the session.

Figure 16:
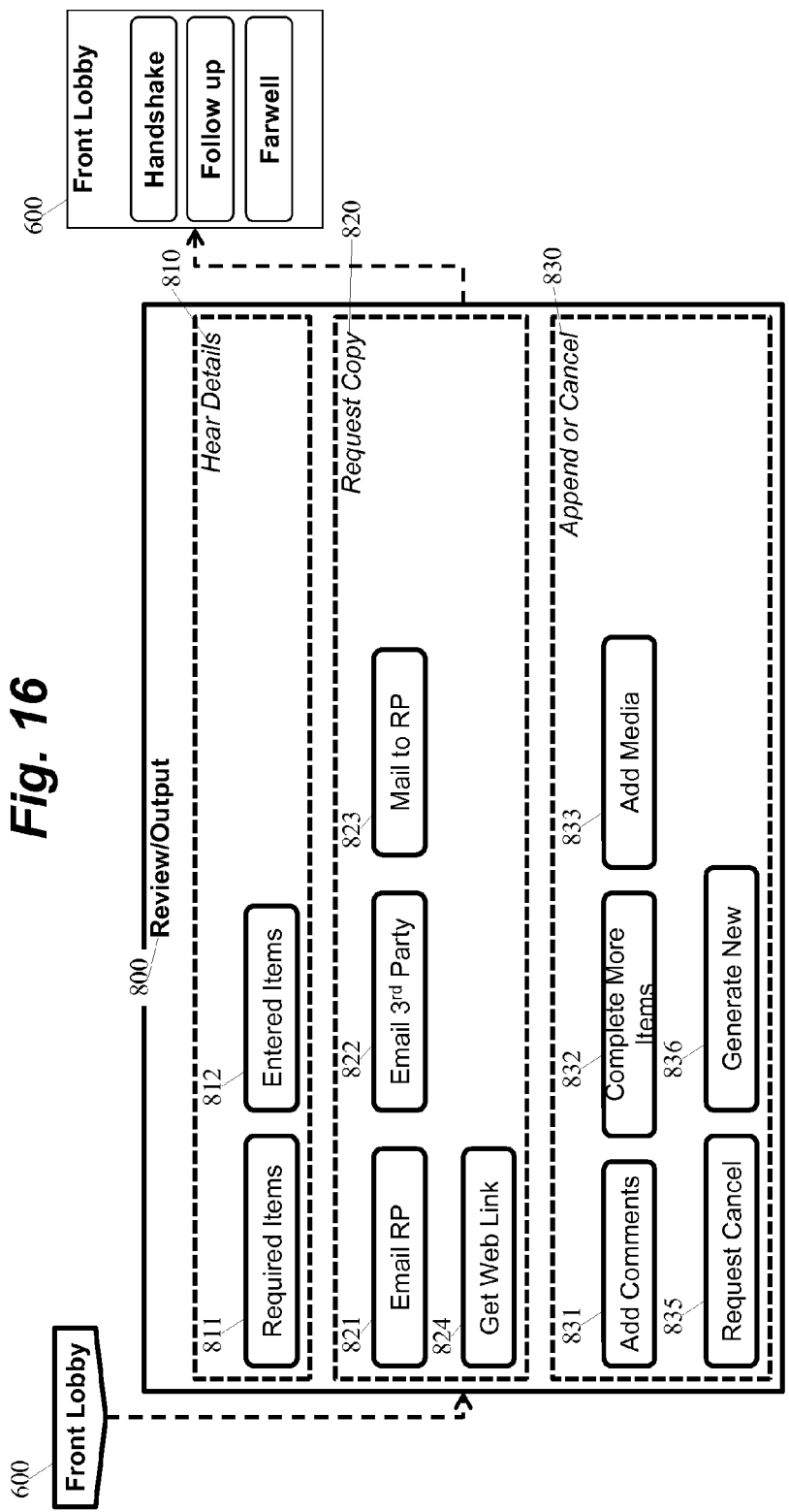
FIG. 16 is an illustration of Review/Output module's functions.

FIG. 16 is an illustration of Review/Output module's 800 functions, which is applicable to any of the suitable examples provided above. The present scenario described for this Review Output module 800 is for a situation where a report was previously entered, and no follow up is required by the RP. Nonetheless, the interested party can still access the report to review it or request a copy by various means.

For example, transcription events may have occurred yielding the need to confirm or alter of previous responses for required items. In that case, those question items are re-presented to the user in the Front Lobby module's 600 Follow-up sub-module 650. The Review/Output module 800 provides a sub-module process for the user to Hear Details 810, limited to just the Required Items 811 for their report, or all Entered Items 812. The Request Copy sub-module 820 can email the reporting party (RP) via process Email RP 821, or Email $3^{rd}$ Party 822, or request regular Mail to RP 823 via a postal service.

In some embodiments, the report or a portion of the report information would be automatically transmitted/forwarded to external public safety systems, as well as to select recipients. This may be accomplished by a computerized out-bound calling/emailing system that would contact the concerned parties via computerized telephone calls, text-messages, and instant messaging services or imaging devices.

Additionally, in the Append or Cancel sub-module 830, users who may have previously completed a report can Add Comments 831, Complete More Items 832 (non-required items), or Add Media 833 via upload. They may also Request Cancelation 835 of the report, or opt to Generate a New 836 crime report.

Figure 17:
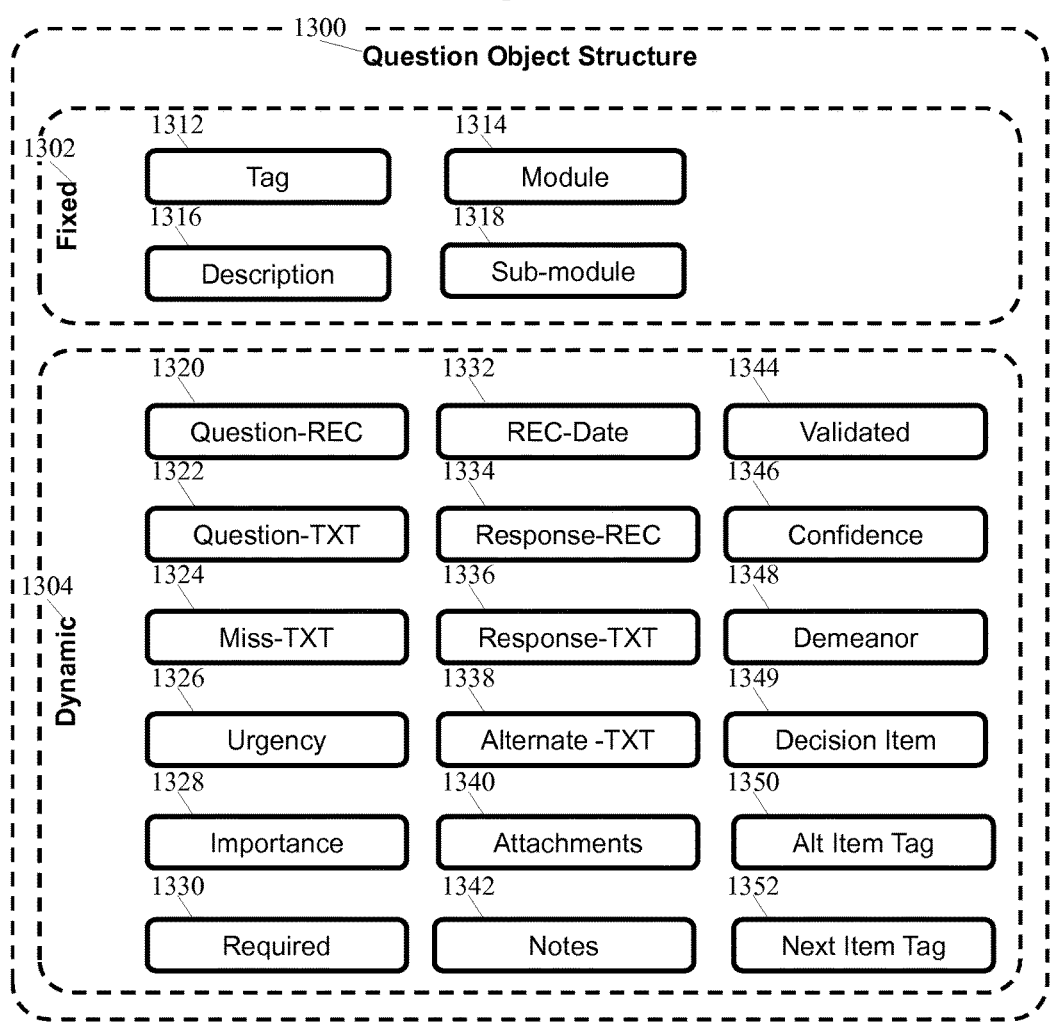
FIG. 17 is an illustration of an exemplary structure of a Question Item object, along with the Fixed and Dynamic properties.
Figure 18:
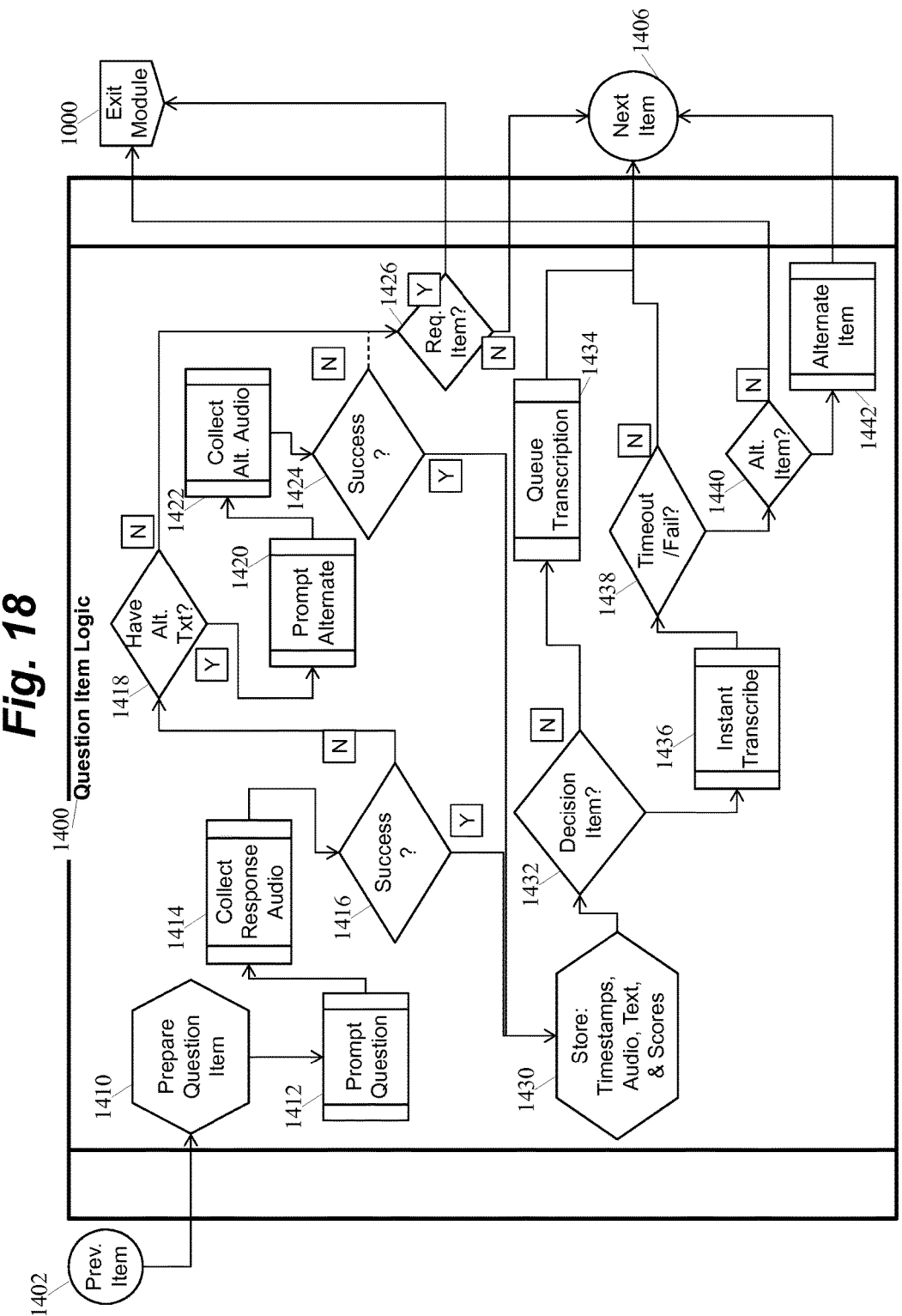
FIG. 18 is an illustration of an exemplary flow path for processing a Question Item.

FIG. 17 is an illustration of an exemplary structure of a Question Item 1300 object, along with the Fixed 1302 and Dynamic 1304 properties for each individual or set of Question Items (See FIG. 18). Each questioning sequence is established by linking the questions items in the logical sequence through the unique Tag 1312 and the Next Item Tag 1352. When multiple question items must be collected in a module, these values are initialized based upon the module structure but may be altered by factors such as: institution-specific settings; source of initial connection to the system; mode of communication; quality of transmission; quality of recent transcriptions; operational conditions of the institution; user and incident location; the previous responses input by the user; and the system status, and so forth.

The Dynamic properties 1304 of a question item store details including: a link to the Question Recording 1320 for pre-recorded media (i.e., voice, video); the Question Text 1322 (i.e., "What is your name?"); the Missed Text 1324 is available should the initial prompt yield difficulty (i.e., "Say your last name, and then your first name.");

The properties Urgency 1326, Importance 1328, Required 1330, and Decision Item 1349 are set when the object is created. These are used to modify the questioning sequence dynamically. For example, under certain dynamic conditions, the reporting party will only be prompted to respond to Required 1330 items. In other cases the system will dynamically choose the method of transcription depending upon the Urgency 1326 or Importance 1328 of the response. A Decision Item 1349 is a question item that requires an immediate response (including transcription) before the questioning sequence can continue. If a Decision Item 1349 cannot be obtained, the session will typically be terminated, though not necessarily so.

When a response in obtained from the user, the Recording Date 1332 and time of the response is stored. The Response Recording 1334 is the link to the audio recording of the response. The Response Text 1336 stores the text of the response obtain directly from the user (e.g., via SMS or web-based session), or the text from the audio transcription.

The transcription process will sometimes yield an Alternate Text 1338 string if the primary transcription is not definitive. The Confidence 1346 is also used to capture a relative factor as to the quality of the transcription. The Validated property indicates the response to the question item has been successfully obtained to the desired confidence level—or has been manually validated by an official.

Voice transcription (manual or automated) can also include determination of the Demeanor 1348 of the speaker. For example, the values such as "positive", "neutral" or "negative" may be used to dynamically alter the questioning sequence as the session progresses. Similar to how an official who is speaking directly to a crime victim will limit their questioning if the victim is upset or otherwise unable to effectively respond, so too the Demeanor 1348 value may limit or alter the extent of the question items covered in the modules and sub-modules.

When selected question items are Required 1330 and the system is unable to obtain an adequate transcription from the RP's response, there may be an alternative question item that, if successful, could be used to successfully derive a response to the original question item. The Alternate Item Tag 1350 holds such an item, if available. For example, should the system have difficulty transcribing the RP's name or date of birth, the alternate question item could be the Driver's License/ID question item which could then be used with an external system to obtain the RP's name and date of birth.

The Attachments 1340 property contains links to any media provided by the user for this question item. The Notes 1342 contains information added to the item during the review process. In a crime report scenario, the set of questions would include the fields contained in the typical crime report of the target institution; and each question would include designations of whether it is required or optional relative to the nature of incident, and/or a target level of transcription timeliness, and/or a desired level of transcription accuracy.

In summary, FIG. 17 exemplifies the structure of a Question Item 1300, along with the Fixed 1302 and Dynamic 1304 properties for each Question Item 1300. The dynamic properties of each question item can be initialized upon entry into Report Input/Edit module 700. The questioning sequence can be established by linking the Question Items 1300 in a predetermined sequence in each sub-module and associated series of components. Certain components may be omitted depending upon the type of crime being reported, and the status of the system and session. In order to provide a questioning order baseline, the questioning sequence would be organized consistent with patterns used by officials of that institution when directly responding to an incident to create a crime report.

FIG. 18 is a flow path illustrating one possible embodiment for processing an individual Question Item 1400. As described previously, Question Item(s) 1400 are linked by Tag, Next Item Tag and, optionally, Alternate Item Tag. The Previous Item 1402 references this instance of a question and the object is prepared 1410 and begins processing. The Prompt 1412 is given to the user and the response is collected 1414. If the criteria for Success 1416 are not met, the object is checked to see if alternate text is available 1418 (Missed-Text). Then Alternate Prompt 1420 is given and if un-Successful 1424, the next processing step depends whether the item is required 1426. If required, processing cannot continue and the processing transfers to the Exit module 1000, otherwise the system will move on directly to the Next Question Item 1406.

In some embodiments, the analysis of responses to the questions would include the incorporation of previous responses, including parsing of responses with comparison to a glossary of significant key words or phrases, along with appropriate computerized instructions to be executed when such words or phrases are encountered. Accordingly, analysis of incident data may include: detection of key words or phrases that trigger certain behaviors; a search of historical premise information at the incident location; comparison to other incidents within the geographic region; chronological alignment with other incidents; and comparison of suspect information received with other incident reports. These complementary and verification information would be obtained from an external database to identify potential correlations with other incident data for the purpose of enhanced decision support during investigation activities.

To assist a user or subsequent official, the exemplary system (depending on the application) would include a computerized display displaying a graphical representation of the institution's incident (e.g., crime) report template, which would contain text of responses provided by the reporting user; time of response input; highlight of required elements for the given incident; context-sensitive pre-defined lists of responses associated with select elements in the template; field-specific access to audio recordings of actual user utterances; access to media uploaded by the user; and ability for the user to override the initial response while retaining it for future reference. Additionally, questions/response conversion could include computerized vocalizations which contain audio annunciations organized by the institution's incident (e.g., crime) report template, the vocalizations having field names and responses for minimum-required information; actual audio response if the response transcription is missing or of low confidence; optional playback of non-required report information submitted by the user; field-specific access to audio recordings of actual user utterances; and access to audio media uploaded by the user.

If the initial or alternate responses are successfully obtained (Yes responses to 1416 or 1424), response data is Stored 1430. The Decision Item property 1432 is checked and this determines if an Instant Transcription 1436 is initiated, or the response is Queued 1434 for normal transcription. Under Queued 1434 for normal transcription, the process proceeds to the next Item 1406 and transcription is de-coupled from the questioning sequence allowing for optimization of transcription resources.

For Question Items requiring Instant Transcription 1436, the session is suspended until the transcription response is received or a Timeout 1438 point is reached. If the transcription fails or times out 1438 and an Alternate Question Item 1440 has been designated, the process continues with that Alternate Item 1442, eventually arriving to Next Item 1406.

Under both transcription circumstances (1436 or 1434), the relative priority of transcription for each item is included in the transcription request. These "urgency" and "importance" properties (along with Decision Item 1432 and Required 1426 flags), will determine its placement in each transcription queue as well as the transcription mechanism chosen. The values of these properties are pre-defined and set during session initialization. For example, if the crime report is for an incident involving harassment, the question item related to the suspect name would have elevated values for urgency and importance. Whereas the question item for the street address where the harassment occurred may have lower values. Therefore, the transcription of the suspect name would be placed higher in the transcription queue than the suspect address. This example assumes the queues have one or more items waiting for transcription. If the queues are empty at the point an audio response is ready for transcription, it will be submitted for transcription immediately.

The above examples are detailed in the context of a crime report, however, other scenarios not related to crime may be easily addressed by the exemplary embodiments, by revising the Question Item 1300 object (questions being asked) to reflect the type of service being addressed. For example, an insurance claim could be processed using an insurance related questioning process. Therefore, the exemplary system can be utilized for purchasing a ticket, buying insurance, reporting an incident, reporting an accident, or reporting a crime. Accordingly, many other industries that require a report to be generated from information gathered from a reporting party could benefit from an exemplary system as described above.

While various processes have been detailed in a specific order, it is understood that the specific order or hierarchy of steps in the processes disclosed is an example of exemplary approaches. Based upon design preferences, the specific order or hierarchy of steps in the processes may be rearranged while remaining within the scope of the present disclosure. The accompanying method claims present elements of the various steps in a sample order, and are not meant to be limited to the specific order or hierarchy presented. Moreover, it is understood that various logic and flow decisions are hardware/software based—being implemented on networked computer system(s), allowing a transformation of information coming in from an audible source to be machine converted into a "high quality," apportioned and filtered and properly formatted "written" output.

Accordingly, it is understood that the modules/sub-modules, functions and operation of various elements of the described embodiments can be implemented in server-based networked systems, with attendant databases, memory systems, and software programs to execute the described functionalities. For example, the exemplary reporting system can be positioned on a server having hardware as illustrated in FIG. 22, with associated input hardware (to process voice/data) calls.

Accordingly, the various embodiments described above are understood to significantly reduce the manpower and time needed for conventional incident reporting, providing significant increases in efficiency and productive allocation of human (i.e., officer/official) resources. The ability to offload ministerial duties to an "intelligent" prompting computerized system that not only provides intelligent querying but, among other things, intelligent report formation, in the field of call-in processing, is understood to be a significant improvement over anything in the prior art.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

It will be understood that many additional changes in the details, materials, steps and arrangement of parts, which have been herein described and illustrated to explain the nature of the disclosure, may be made by those skilled in the art within the principal and scope of the disclosure as expressed in the appended claims.

What is claimed is:

1. An automated, computerized incident reporting apparatus, comprising:
   a call-in system, adapted to receive a call-in containing at least one of received voice and text from an unknown user reporting an unknown incident;
   a web-services connection system, adapted to access an emergency public-safety access point system, to provide at least one of complementary information and verification information concerning at least one of the unknown user and the unknown incident; and
   an automated voice processing service, adapted to receive at least one of the complementary information and verification information, perform an automatic analysis of at least one of the received voice and text, respond to the unknown user with context and key word sensitive questions, based on responses to the questions, identify at least one of the unknown user and unknown incident, associate an ID to the unknown incident, forward the received voice to a transcription service, receive a transcription from the transcription service, create from the transcription and text (if received from the unknown user) and from the complementary information and verification information a report detailing facts of the unknown incident, enable an authorized person to review and edit the report, and create a finalized report of the unknown incident,
   wherein the context and key word sensitive questions utilize a questioning structure with fixed and dynamic properties.

2. The apparatus of claim 1, wherein at least one of the call-in system and automated voice processing service is further adapted to determine a response capability of a device used by the unknown user during the call-in and provide an incident reporting assistance application to be downloaded onto the device if it is capable of running the application, to proxy oral querying.

3. The apparatus of claim 1, further comprising a transcription mode selector adapted to select a mode of transcription based on a criteria comprising of at least one of transcription service costs, process duration, transcription quality, current service performance levels, transcription processing time, and a nature of information being transcribed.

4. The apparatus of claim 3, wherein the transcription service is further adapted to repeat original responses by a secondary person whose voice is directly linked to automated speech recognition services with higher accuracy.

5. The apparatus of claim 1, wherein the complementary information and verification information is obtained from an external crime database system and is used to identify and document potential correlations with other incident data, thereby enhancing decision support during investigation activities.

6. The apparatus of claim 1, wherein the automated voice processing service is further adapted to transmit an incident report in part or in whole to at least one of an external public safety system, a select recipient via email, a concerned party via an outbound computerized telephone call or text-message or instant messaging service.

7. The apparatus of claim 6, wherein the automated voice processing service is further adapted to enable a reporting party to provide follow-up information and follow-up action for the incident after completion of the call-in or prohibit further input of information into the incident report.

8. The apparatus of claim 5, wherein the automated voice processing service is further configured with a computerized display for displaying a graphical representation of an institution's report template, the template comprising:
   text of responses provided by the unknown user;
   time of response input;
   highlight of required elements for the unknown incident;
   context-sensitive pre-defined lists of responses;
   field-specific access to audio recordings of utterances from the unknown user;
   access to media uploaded by the unknown user; and
   ability for the unknown user to override an initial response while retaining it for future reference.

9. The apparatus of claim 8, wherein the automated voice processing service is further adapted to include computerized vocalizations which include audio annunciations organized by the institution's report template, the vocalizations comprising:
   field names and responses for minimum-required information;
   actual audio response if the transcription for the user's response is missing or of low confidence;
   optional playback of non-required report information submitted by the unknown user;
   field-specific access to audio recordings of utterances from the unknown user; and
   access to audio media uploaded by the unknown user.

10. The apparatus of claim 1, wherein the automatic analysis comprises:
    pre-designation of incident types with required and optional elements needed to fully complete the report;
    dynamic generation of a listing of required but not yet received report information;
    automatic field-level comparison of a selected report to other reports to merge data from duplicate incident reports; and
    supplemental notification of a detection of user-uttered key words or phrases, with a suggested corresponding action.

11. The apparatus of claim 1, wherein the automated voice processing service is adapted to further provide for the authorized person an access control for follow-up editing of the report, the access control comprising, a combination of unique record identifier, code, phone number, or user credential, wherein based on a selection by the authorized person, specific report details are made available to the user for review, input or revision in the follow-up, and a modified questioning is performed by the automated voice processing service.

12. The apparatus as in any of the preceding claims, wherein the automated voice processing service is adapted to enable the user to perform an action of at least one of purchasing a ticket, buying insurance, reporting an incident, reporting an accident, or reporting a crime.

13. A method for automatically generating an incident report, comprising:
    receiving a call-in containing at least one of received voice and text from an unknown user reporting an unknown incident at a call-in system;
    accessing an emergency public-safety access point system, to provide at least one of complementary information and verification information concerning at least one of the unknown user and the unknown incident via a web-services connection system; and receiving at least one of the complementary information and verification information, perform an automatic analysis of at least one of the received voice and text, respond to the unknown user with context and key word sensitive questions, associate an ID to the unknown incident, forward the received voice to a transcription service, receive a transcription from the transcription service, create from the transcription and text (if received from the user) and from the complementary information and verification information a report detailing facts of the incident, enable an authorized person to review and edit the report, and create a finalized report of the unknown incident, via automated voice processing service, wherein the context and key word sensitive questions utilize a questioning structure with fixed and dynamic properties.

14. The method of claim 13, wherein the context is used to establish questioning sequences and dynamically determined details including at least one of institution-specific settings, source of initial connection to the system, mode of communication, quality of transmission, quality of recent transcriptions, operational conditions of the institution, unknown user and unknown incident location, previous responses input by the unknown user, and system status.

15. The method of claim 13, wherein the questioning sequence includes fields contained in a typical report of a target institution, and each question includes designations of whether it is required or optional relative to a nature of the incident, a target level of transcription timeliness, and a desired level of transcription accuracy.

16. The method of claim 15, wherein a response to the questioning sequence is compared to a glossary of significant key words or phrases and, when detected, trigger at least one of a search of historical premise information at an incident location, a comparison to other incidents within a geographic region, a chronological alignment with other incidents, and a comparison of suspect information received with other incident reports.

17. The method of claim 16, wherein the automated voice processing service enables the unknown user to perform an action of at least one of purchasing a ticket, buying insurance, reporting the unknown incident, reporting an accident, or reporting a crime.

18. An automated, computerized incident reporting apparatus, comprising:
 a call-in system, adapted to receive a call-in containing at least one of received voice and text from a user reporting an incident;
 a web-services connection system, adapted to access an emergency public-safety access point system, to provide at least one of complementary information and verification information concerning at least one of the user and the incident; and
 an automated voice processing service, adapted to receive at least one of the complementary information and verification information, perform an automatic analysis of at least one of the received voice and text, respond to the user with context and key word sensitive questions, associate an ID to the incident, forward the received voice to a transcription service, receive a transcription from the transcription service, create from the transcription and text (if received from the user) and from the complementary information and verification information a report detailing facts of the incident, enable an authorized person to review and edit the report, and create a finalized report of the incident,
 wherein the context and key word sensitive questions utilize a questioning structure with fixed and dynamic properties, and wherein the context is associated with at least two of: institution-specific settings, source of initial connection to the reporting system, mode of communication, quality of transmission, quality of recent transcriptions, institutional operational conditions, user and incident location, previous responses input by the user, and system status.

* * * * *